(12) United States Patent
Hayata

(10) Patent No.: US 8,211,508 B2
(45) Date of Patent: Jul. 3, 2012

(54) PROCESS FOR PRODUCING MOLDED PRINTED MATERIAL, AND MOLDED PRINTED MATERIAL

(75) Inventor: Yuuichi Hayata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 543 days.

(21) Appl. No.: 11/860,077

(22) Filed: Sep. 24, 2007

(65) Prior Publication Data

US 2008/0075882 A1 Mar. 27, 2008

(30) Foreign Application Priority Data

Sep. 25, 2006 (JP) ................................. 2006-258691
Sep. 6, 2007 (JP) ................................. 2007-230892

(51) Int. Cl.
*B29C 71/02* (2006.01)
*B41M 5/26* (2006.01)
*B32B 3/00* (2006.01)
*B32B 27/14* (2006.01)
*B41J 2/01* (2006.01)

(52) U.S. Cl. .............. 427/542; 522/74; 522/75; 522/78; 522/84; 522/85; 503/227

(58) Field of Classification Search .................. None
See application file for complete search history.

(56) References Cited

U.S. PATENT DOCUMENTS

| | | | | |
|---|---|---|---|---|
| 4,369,885 A | * | 1/1983 | Redmond | 206/484 |
| 5,395,863 A | * | 3/1995 | Burns et al. | 522/71 |
| 2001/0003731 A1 | * | 6/2001 | Ochiai et al. | 503/227 |
| 2003/0083396 A1 | * | 5/2003 | Ylitalo et al. | 522/74 |
| 2005/0250869 A1 | * | 11/2005 | Claes et al. | 522/71 |
| 2008/0075883 A1 | * | 3/2008 | Hayata et al. | 427/542 |
| 2008/0075884 A1 | * | 3/2008 | Hayata | 427/542 |
| 2008/0108747 A1 | * | 5/2008 | Nakamura et al. | 524/606 |
| 2009/0074982 A1 | * | 3/2009 | Nakamura et al. | 427/511 |
| 2009/0087626 A1 | * | 4/2009 | Hayata et al. | 428/195.1 |

(Continued)

FOREIGN PATENT DOCUMENTS

JP 5-214279 A 8/1993

(Continued)

OTHER PUBLICATIONS

Japanese Office Action dated Dec. 13, 2011 issued in a corresponding Japanese Patent Application No. 2007-230892.

*Primary Examiner* — Melvin C Mayes
*Assistant Examiner* — Yun Qian
(74) *Attorney, Agent, or Firm* — Sughrue Mion, PLLC

(57) ABSTRACT

A process for producing a molded printed material is provided that includes (A) a step of forming an image by discharging an ink composition on a support by an inkjet method, the ink composition comprising at least 60 wt % relative to the entire ink composition of at least one monofunctional radically polymerizable monomer having only one unsaturated double bond group selected from the group consisting of an acrylate group, a methacrylate group, an acrylamide group, a methacrylamide group, and an N-vinyl group and having at least one cyclic structure-containing group, (B) a step of curing the ink composition by irradiating with actinic radiation the image obtained so as to obtain a printed material having the image cured on the support, and (C) a step of molding the printed material. There is also provided a molded printed material obtained by the process for producing a molded printed material.

15 Claims, 2 Drawing Sheets

SIDE VIEW OF MOLD

TOP VIEW OF MOLD

PROJECTING MOLD     RECESSED MOLD

U.S. PATENT DOCUMENTS

Figure 1:
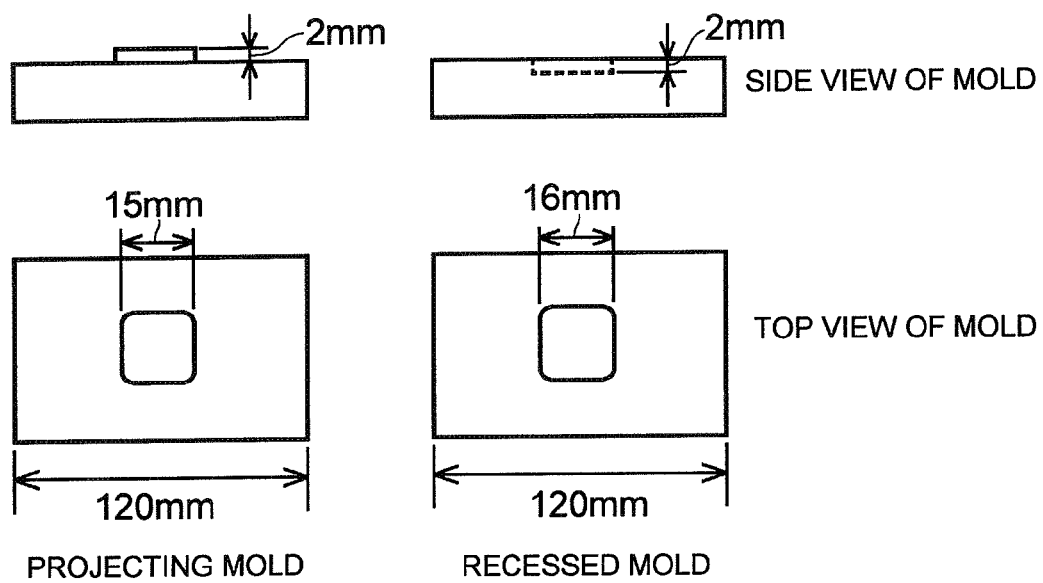

2009/0202795 A1 * 8/2009 Hayata et al. ............. 428/195.1

FOREIGN PATENT DOCUMENTS

| | | | |
|---|---|---|---|
| JP | 08-150692 | * | 11/1996 |
| JP | 3119282 | B2 | 10/2000 |
| JP | 2002-012801 | A | 1/2002 |
| JP | 2002-371216 | A | 12/2002 |
| JP | 2003-326591 | A | 11/2003 |
| JP | 2004-099796 | A | 4/2004 |
| JP | 2004-526820 | A | 9/2004 |
| JP | 2004-314552 | A | 11/2004 |
| JP | 2005026270 | | 3/2005 |
| JP | 2006-016455 | A | 1/2006 |
| JP | 2006-131837 | A | 5/2006 |
| JP | 2006-159417 | A | 6/2006 |
| JP | 2006-169420 | A | 6/2006 |
| JP | 2007-131755 | A | 2/2007 |
| JP | 2007-056232 | A | 3/2007 |
| WO | 02/38688 | A2 | 5/2002 |
| WO | 02/061001 | A1 | 8/2002 |
| WO | WO 2007/013368 | A1 | 2/2007 |
| WO | WO 2007/097049 | A1 | 8/2007 |

* cited by examiner

PROCESS FOR PRODUCING MOLDED PRINTED MATERIAL, AND MOLDED PRINTED MATERIAL

BACKGROUND OF THE INVENTION

1. Field of the Invention

The present invention relates to a process for producing a molded printed material, and to a molded printed material.

2. Description of the Related Art

Molded printed sheets (decorative sheets) are used today in various applications. For example, the surface sheet of a membrane switch used in an electrical product, etc. is produced by forming an image on a thin plastic sheet (PET, polycarbonate, polystyrene, etc. having a film thickness of about 100 μm) and then embossing it in order to impart a click feel to a switch portion (click portion). Furthermore, there are many cases in which, in order to give a printed material a matte appearance or a three-dimensional feel in design, the printed material is subjected to embossing.

Moreover, drink product vending machines for drinking water, tea, juice, etc. are widespread, and these vending machines display dummy display items of products for sale. As such dummy display items, a flat support that is formed by subjecting a transparent thermoplastic resin sheet to decorative printing is deep drawn to give a halved shape of an actual-size drink product container, thus forming a deep-drawn molding with a rise of 25 mm or higher in some cases, and the back face is illuminated so as to give a strong appeal to the product image.

As a process for producing a deep-draw molding from such a decorative thermoplastic resin sheet, vacuum forming, pressure forming, or vacuum/pressure forming is most suitable. In principle, vacuum forming involves preheating a flat support to a temperature at which it can be thermally deformed, and pressing and cooling it against a mold while drawing it to the mold by means of reduced pressure, and pressure forming involves pressing and cooling it against a mold while applying pressure from the side opposite to the mold. Vacuum/pressure forming involves carrying out the reduction in pressure and the application of pressure at the same time.

Therefore, in embossing, vacuum forming, pressure forming, and vacuum/pressure forming (hereinafter, called 'vacuum forming, etc.'), since a thermoplastic resin sheet used as a substrate is required to have a high degree of stretchability in a heated state, a polycarbonate resin sheet, a polyester resin sheet, a cured vinyl chloride resin sheet, a polystyrene resin sheet, etc. are generally used, and from the viewpoint of ease of decorative printing and various resistance properties of a molding formed by vacuum forming, etc. being excellent, a polycarbonate resin sheet or a polyester resin sheet, and in particular a polycarbonate resin sheet, is most suitably used. As the thermoplastic resin sheet, one having a thickness of on the order of 0.1 to 0.8 mm, and preferably on the order of 0.3 to 0.6 mm, is generally used.

Furthermore, for decorating the above sheet a solvent-based ink containing a colorant such as a pigment as an ink and, as a binder, a vinyl chloride copolymer, a solvent-soluble polyester resin, an acrylic resin, etc. is normally used. A decorative printed layer that has been printed using such an ink is very suitably used since it exhibits good stretchability in vacuum forming, etc. by conforming to the substrate sheet in a heated state.

However, in the above-mentioned conventional method, since a solvent-based ink is used, there is the environmental problem that the solvent must be removed by evaporation, and there is the difficulty that thermal energy and drying time for removing the solvent by evaporation are required.

From such a viewpoint, printing a thermoplastic resin sheet using a UV-curing ink, which does not employ a solvent, and then processing it has been proposed (Japanese Patent No. 3119282). However, this proposal relates to cold bending, or to pressing or thermal pressing in which the rise angle is as small as on the order of 45° and the draw depth is as small as on the order of only 5 mm, and no attempt has been made to use a UV-curing colored ink for decorating a deep-drawn vacuum-formed product in which the sheet is drawn by a factor of several times.

Conventionally, as a printing method for obtaining a printed sheet (decorative sheet) to which molding, for example, vacuum forming, etc., is applied, a printing method employing a printing plate such as offset printing, screen printing, or gravure printing is used. These printing methods require an expensive printing system and preparation of a printing plate, and are not suitable for small-scale production because of the cost and effort.

On the other hand, in the inkjet method, the printing system is inexpensive, and no plate is required for printing; since an image is formed directly on a recording medium by discharging ink only onto a required image area, the ink can be used efficiently, and the running cost is low, particularly in small lot production. Moreover, the inkjet method has attracted attention in recent years since noise is low and it is excellent as an image recording method.

In particular, with regard to an inkjet recording ink that can be cured by irradiation with radiation such as ultraviolet rays (radiation curing type inkjet recording ink), since a majority of the ink component is cured by irradiation with radiation such as ultraviolet rays, the drying properties are excellent compared with a solvent-based ink and, furthermore, since an image obtained is resistant to spreading, the method can be applied to the printing of various types of substrate.

There is a demand for a radiation curing type ink composition that cures with high sensitivity in order to form a high quality image.

By achieving higher sensitivity for the ink composition, high curability upon exposure to actinic radiation can be imparted, and there are therefore provided various benefits such as a reduction in power consumption, longer lifetime of an actinic radiation generator due to a decrease in the load thereon, and suppression of evaporation of uncured low molecular weight material and of a reduction in the strength of an image formed.

Furthermore, there is a desire for an ink composition that gives an image (printed material) that is resistant to cracking, peeling off, etc., and gives a cured film that has excellent impact resistance, flexibility, and adhesion to a substrate. A cured film having high flexibility, impact resistance, and adhesion to a substrate enables a printed material to be displayed or stored for a long period of time in various environments while maintaining high image quality, and also has advantages such as ease of handling of the printed material.

An ink composition used for obtaining a molded printed sheet (decorative sheet) is required to have a high level of cured film flexibility since an ink coating is stretched during molding. Furthermore, it is necessary for the cured film to have a strength that can withstand molding. Conventionally, ink compositions having high flexibility have been disclosed (International Patent Applications WO 2002/038688 and WO 2005/026270), but they have the problems that the film strength is insufficient, scratches or pinholes are caused on an image during molding, and cracks occur due to poor resistance to stretching.

Moreover, an ink that can be used in vacuum forming or pressure forming and can be cured by irradiation with radiation such as ultraviolet rays has been disclosed (JP-A-2003-326591 (JP-A denotes a Japanese unexamined patent application publication)), but it has high viscosity and cannot be applied to the inkjet method.

BRIEF SUMMARY OF THE INVENTION

It is an object of the present invention to provide a process for producing a molded printed material in which cracks and image dropouts are not generated when carrying out molding such as embossing, vacuum forming, pressure forming, or vacuum/pressure forming, and a molded printed material obtained by the process for producing a molded printed material.

These objects have been accomplished by means described in (1) and (17) below. They are described below together with (2) to (16), which are preferred embodiments.

(1) A process for producing a molded printed material comprising: (A) a step of forming an image by discharging an ink composition on a support by an inkjet method, the ink composition comprising at least 60 wt % relative to the entire ink composition of at least one monofunctional radically polymerizable monomer having only one unsaturated double bond group selected from the group consisting of an acrylate group, a methacrylate group, an acrylamide group, a methacrylamide group, and an N-vinyl group and having at least one cyclic structure-containing group; (B) a step of curing the ink composition by irradiating with actinic radiation the image obtained so as to obtain a printed material having the image cured on the support; and (C) a step of molding the printed material, (2) The process for producing a molded printed material according to (1), wherein the ink composition comprises at least one monofunctional radically polymerizable monomer having only one unsaturated double bond group selected from the group consisting of an acrylate group, a methacrylate group, an acrylamide group, and a methacrylamide group and having at least one cyclic structure-containing group, (3) The process for producing a molded printed material according to (1), wherein the ink composition comprises at least one monofunctional radically polymerizable monomer having only one N-vinyl group and having at least one cyclic structure-containing group, (4) The process for producing a molded printed material according to (1), wherein the ink composition comprises at least one monofunctional radically polymerizable monomer having only one unsaturated double bond group selected from the group consisting of an acrylate group, a methacrylate group, an acrylamide group, and a methacrylamide group and having at least one cyclic structure-containing group, and at least one monofunctional radically polymerizable monomer having only one N-vinyl group and having at least one cyclic structure-containing group, (5) The process for producing a molded printed material according to (2), wherein the monofunctional radically polymerizable monomer having only one unsaturated double bond group selected from the group consisting of an acrylate group, a methacrylate group, an acrylamide group, and a methacrylamide group and having at least one cyclic structure-containing group is a compound represented by Formula (1),

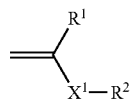

Formula (1)

in Formula (1), $R^1$ denotes a hydrogen atom or a methyl group, $X^1$ denotes a first divalent linking group in which (—C(O)O—) or (—C(O)NH—) is bonded to the ethylenically unsaturated double bond shown in Formula (1), the first divalent linking group may be bonded to at least one second divalent linking group selected from the group consisting of a single bond, an ether bond (—O—), an ester bond (—C(O)O— or OC(O)—), an amide bond (—C(O)NH— or —NHC(O)—), a carbonyl bond (—C(O)—), and an optionally branched alkylene group having no greater than 20 carbons, $R^2$ is a group having at least one cyclic structure, and the group having a cyclic structure denotes an aromatic group comprising a monocyclic aromatic group or a polycyclic aromatic group, or an alicyclic hydrocarbon group comprising a cycloalkane skeleton, an adamantane skeleton, or a norbornane skeleton, (6) The process for producing a molded printed material according to (5), wherein the monofunctional radically polymerizable monomer represented by Formula (1) is at least one monomer selected from the group consisting of dicyclopentenyloxyethyl (meth)acrylate, dicyclopentanyl (meth)acrylate, 2-naphthyl (meth)acrylate, isobornyl (meth)acrylate, phenoxyethyl (meth)acrylate, tetrahydrofurfuryl (meth)acrylate, and N-cyclohexyl (meth)acrylamide, (7) The process for producing a molded printed material according to (3), wherein the monofunctional radically polymerizable monomer having only one N-vinyl group and having at least one cyclic structure-containing group is at least one monomer selected from the group consisting of N-vinylcarbazole, 1-vinylimidazole, and an N-vinyllactam, (8) The process for producing a molded printed material according to (3), wherein the monofunctional radically polymerizable monomer having only one N-vinyl group and having at least one cyclic structure-containing group is an N-vinyllactam, (9) The process for producing a molded printed material according to (8), wherein the N-vinyllactam is a compound represented by Formula (2),

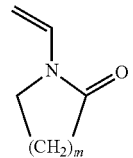

Formula (2)

in the formula, m denotes an integer of 1 to 5,

(10) The process for producing a molded printed material according to (8), wherein the N-vinyllactam is N-vinylcaprolactam,

(11) The process for producing a molded printed material according to (2), wherein the ink composition comprises 10 to 40 wt % relative to the entire ink composition of the monofunctional radically polymerizable monomer having only one N-vinyl group and having at least one cyclic structure-containing group,

(12) The process for producing a molded printed material according to (1), wherein the ink composition comprises a radical polymerization initiator and a colorant,
(13) The process for producing a molded printed material according to (1), wherein the ink composition comprises an acyclic monofunctional monomer, the content of the acyclic monofunctional monomer being no greater 20 wt % of the entire ink composition,
(14) The process for producing a molded printed material according to (1), wherein the ink composition comprises a polyfunctional monomer, the content of the polyfunctional monomer being no greater than 18.4 wt % of the entire ink composition,
(15) The process for producing a molded printed material according to (1), wherein the support is polyethylene terephthalate,
(16) The process for producing a molded printed material according to (1), wherein the molding is embossing, vacuum forming, pressure forming, or vacuum/pressure forming,
(17) A molded printed material obtained by the process for producing a molded printed material according to (1).

BRIEF DESCRIPTION OF DRAWINGS (FIG. 1) A schematic drawing of a projecting mold and a recessed mold used in the embossing test.
(FIG. 2) A schematic drawing of a wooden mold used in the vacuum forming test.

DETAILED DESCRIPTION OF THE INVENTION

The process for producing a molded printed material of the present invention comprises
(A) a step of forming an image by discharging an ink composition on a support by an inkjet method, the ink composition comprising at least 60 wt % relative to the entire ink composition of a monofunctional radically polymerizable monomer having only one unsaturated double bond group selected from the group consisting of an acrylate group, a methacrylate group, an acrylamide group, a methacrylamide group, and an N-vinyl group and having at least one cyclic structure-containing group,
(B) a step of curing the ink composition by irradiating with actinic radiation the image obtained so as to obtain a printed material having the image cured on the support, and
(C) a step of molding the printed material.
The present invention is explained in detail below.
Ink Composition
The ink composition that can be used in the present invention is an ink composition that can be cured by irradiation with actinic radiation.
The ink composition that can be used in the present invention comprises a monofunctional radically polymerizable monomer, and may comprise as necessary a radical polymerization initiator, a colorant, a dispersant, a surfactant, a radically polymerizable compound other than the above-mentioned monofunctional radically polymerizable monomer, etc.
The 'actinic radiation' referred to in the present invention is not particularly limited as long as it is actinic radiation that can provide energy that enables an initiating species to be generated in the ink composition when irradiated, and broadly includes α rays, γ rays, X rays, ultraviolet rays (UV), visible light, and an electron beam; among these, ultraviolet rays and an electron beam are preferable from the viewpoint of curing sensitivity and the availability of equipment, and ultraviolet rays are particularly preferable. The ink composition of the present invention is therefore preferably one that can cure upon exposure to ultraviolet rays.
Monofunctional Radically Polymerizable Monomer
The ink composition that can be used in the present invention comprises a monofunctional radically polymerizable monomer having only one ethylenically unsaturated double bond group selected from the group consisting of an acrylate group, a methacrylate group, an acrylamide group, a methacrylamide group, and an N-vinyl group and having at least one cyclic structure-containing group.
Examples of the monofunctional radically polymerizable monomer that can be used in the present invention include ethylenically unsaturated compounds represented by Formula (1) below.

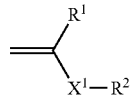

Formula (1)

In Formula (1) above, $R^1$ denotes a hydrogen atom or a methyl group.
$X^1$ denotes a first divalent linking group in which (—C(O)O—) or (—C(O)NH—) is bonded to the ethylenically unsaturated double bond shown in Formula (1), the first divalent linking group may be bonded to a second divalent linking group that is a single bond, an ether bond (—O—), an ester bond (—C(O)O— or OC(O)—), an amide bond (—C(O)NH— or —NHC(O)—), a carbonyl bond (—C(O)—), an optionally branched alkylene group having no greater than 20 carbons, or a combination thereof, and it is preferable for $X^1$ to be the first divalent linking group alone or one having an ether bond, an ester bond, and/or an alkylene group having no greater than 20 carbons when it has the second divalent linking group.
$R^2$ is a monovalent to trivalent, and preferably monovalent, group having at least one cyclic structure, and denotes an aromatic group such as a monocyclic aromatic group or a polycyclic aromatic group, or an alicyclic hydrocarbon group having a cycloalkane skeleton, an adamantane skeleton, or a norbornane skeleton. The aromatic group and the alicyclic hydrocarbon group may comprise a heteroatom such as O, N, or S in the cyclic structure. When $R^2$ is a divalent or trivalent group, $R^2$ may further have Cl, a hydroxyl group, or an alkoxy group bonded thereto.
In Formula (1), the aromatic group denoted by $R^2$ is preferably a phenyl group or a phenylene group, which are monocyclic aromatic groups, or a polycyclic aromatic group having 2 to 4 rings, but is not limited thereto, and specific examples thereof include a naphthyl group, a naphthalenediyl group, a naphthalenetriyl group, an anthryl group, an anthracenediyl group, an anthracenetriyl group, a 1H-indenyl group, a 1H-indenediyl group, a 1H-indenetriyl group, a 9H-fluorenyl group, a 9H-fluorenediyl group, a 9H-fluorenetriyl group, a 1H-phenalenyl group, a 1H-phenalenediyl group, a 1H-phenalenetriyl group, a phenanthrenyl group, a phenanthrenediyl group, a phenanthrenetriyl group, a triphenylenyl group, a triphenylenediyl group, a triphenylenetriyl group, a pyrenyl group, a pyrenediyl group, a pyrenetriyl group, a naphthacenyl group, a naphthacenediyl group, a naphthacenetriyl group, a tetraphenylenyl group, a tetraphenylenediyl group, a tetraphenylenetriyl group, a biphenylenyl group, a biphenylenediyl group, a biphenylenetriyl group, an as-indacenyl group, an as-indacenediyl group, an as-indacenetriyl group, an s-indacenyl group, an s-indacenediyl group, an s-indacenetriyl group, an acenaphthylenyl group, an acenaphthylenediyl group, an acenaphthylenetriyl group, a fluoranthenyl group, a fluoranthenediyl group, a fluoranthenetriyl group, an acephenanthrenyl group, an acephenanthrenediyl group, an acephenanthrenetriyl group, an aceanthrenyl group, an aceanthrenediyl group, an aceanthrenetriyl group, a chrysenyl group, a chrysenediyl group, a chrysenetriyl group, a pleiadenyl group, a pleiadenediyl group, and a pleiadenetriyl group.

These aromatic groups may be aromatic heterocyclic groups containing a heteroatom such as O, N, or S. Specific examples thereof include monocyclic aromatic heterocyclic groups such as a furyl group, a furandiyl group, a furantriyl group, a thiophenyl group, a thiophenediyl group, a thiophenetriyl group, a 1H-pyrrolyl group, a 1H-pyrrolediyl group, a 1H-pyrroletriyl group, a 2H-pyrrolyl group, a 2H-pyrrolediyl group, a 2H-pyrroletriyl group, a 1H-pyrazolyl group, a 1H-pyrazolediyl group, a 1H-pyrazoletriyl group, a 1H-imidazolyl group, a 1H-imidazolediyl group, a 1H-imidazoletriyl group, an isooxazolyl group, an isooxazolediyl group, an isooxazoletriyl group, an isothiazolyl group, an isothiazolediyl group, an isothiazoletriyl group, a 2H-pyranyl group, a 2H-pyrandiyl group, a 2H-pyrantriyl group, a 2H-thiopyranyl group, a 2H-thiopyrandiyl group, a 2H-thiopyrantriyl group, a pyridyl group, a pyridinediyl group, a pyridinetriyl group, a pyridazinyl group, a pyridazinediyl group, a pyridazinetriyl group, a pyrimidinyl group, a pyrimidinediyl group, a pyrimidinetriyl group, a pyrazinyl group, a pyrazinediyl group, a pyrazinetriyl group, a 1,2,3-triazolyl group, a 1,2,3-triazolediyl group, a 1,2,3-triazoletriyl group, a 1,2,4-triazolyl group, a 1,2,4-triazolediyl group, and a 1,2,4-triazoletriyl group.

Furthermore, examples thereof include polycyclic aromatic heterocyclic groups such as a thianthrenyl group, a thianthrenediyl group, a thianthrenetriyl group, an isobenzofuranyl group, an isobenzofurandiyl group, an isobenzofurantriyl group, an isochromenyl group, an isochromenediyl group, an isochromenetriyl group, a 4H-chromenyl group, a 4H-chromenediyl group, a 4H-chromenetriyl group, an xanthenyl group, a xanthenediyl group, a xanthenetriyl group, a phenoxathiinyl group, a phenoxathiinediyl group, a phenoxathiinetriyl group, an indolizinyl group, an indolizinediyl group, an indolizinetriyl group, an isoindolyl group, an isoindolediyl group, an isoindoletriyl group, an indolyl group, an indolediyl group, an indoletriyl group, an indazolyl group, an indazolediyl group, an indazoletriyl group, a purinyl group, a purinediyl group, a purinetriyl group, a 4H-quinolizinyl group, a 4H-quinolizinediyl group, a 4H-quinolizinetriyl group, an isoquinolyl group, an isoquinolinediyl group, an isoquinolinetriyl group, a quinolino group, a quinolinediyl group, a quinolinetriyl group, a phthalazinyl group, a phthalazinediyl group, a phthalazinetriyl group, a naphthyridinyl group, a naphthyridinediyl group, a naphthyridinetriyl group, a quinoxalinyl group, a quinoxalinediyl group, a quinoxalinetriyl group, a quinazolinyl group, a quinazolinediyl group, a quinazolinetriyl group, a cinnolinyl group, a cinnolinediyl group, a cinnolinetriyl group, a pteridinyl group, a pteridinediyl group, a pteridinetriyl group, a carbazolyl group, a carbazolediyl group, a carbazoletriyl group, a β-carbolinyl group, a β-carbolinediyl group, a β-carbolinetriyl group, a phenanthridinyl group, a phenanthridinediyl group, a phenanthridinetriyl group, an acridinyl group, an acridinediyl group, an acridinetriyl group, a perimidinyl group, a perimidinediyl group, a perimidinetriyl group, a phenanthrolinyl group, a phenanthrolinediyl group, a phenanthrolinetriyl group, a phenazinyl group, a phenazinediyl group, a phenazinetriyl group, a phenothiazinyl group, a phenothiazinediyl group, a phenothiazinetriyl group, a phenoxazinyl group, a phenoxazinediyl group, a phenoxazinetriyl group, a pyrrolizinyl group, a pyrrolizinediyl group, and a pyrrolizinetriyl group.

These aromatic groups may have one or more halogen atoms, hydroxyl groups, amino groups, thiol groups, siloxane groups, or substituents having no greater than 30 carbons. The aromatic group may form a cyclic structure containing a heteroatom such as O, N, or S from two or more substituents thereof as in, for example, phthalic anhydride or phthalimide anhydride.

Furthermore, $R^2$ of Formula (1) is a monovalent to trivalent group, and preferably a monovalent group, and may be an alicyclic hydrocarbon group. It may be a group having an alicyclic hydrocarbon group containing a heteroatom such as O, N, or S.

The alicyclic hydrocarbon group may be a group having a cycloalkane having 3 to 12 carbons.

Specific examples of the alicyclic hydrocarbon group containing a heteroatom such as O, N, or S include a pyrrolidinyl group, a pyrrolidinediyl group, a pyrrolidinetriyl group, a pyrazolidinyl group, a pyrazolidinediyl group, a pyrazolidinetriyl group, an imidazolidinyl group, an imidazolidinediyl group, an imidazolidinetriyl group, an isooxazolidinyl group, an isooxazolidinediyl group, an isooxazolidinetriyl group, an isothiazolidinyl group, an isothiazolidinediyl group, an isothiazolidinetriyl group, a piperidinyl group, a piperidinediyl group, a piperidinetriyl group, a piperazinyl group, a piperazinediyl group, a piperazinetriyl group, a morpholinyl group, a morpholinediyl group, a morpholinetriyl group, a thiomorpholinyl group, a thiomorpholinediyl group, a thiomorpholinetriyl group, a diazolyl group, a diazolediyl group, a diazoletriyl group, a triazolyl group, a triazolediyl group, a triazoletriyl group, a tetrazolyl group, a tetrazolediyl group, and a tetrazoletriyl group.

These alicyclic hydrocarbon and heterocycle-containing alicyclic hydrocarbon groups may have a substituent, and the substituent is preferably a halogen atom, a hydroxyl group, an amino group, a thiol group, a siloxane group, an optionally substituted hydrocarbon group having a total of no greater than 30 carbons, a heterocyclic group containing a heteroatom such as O, N, or S, or an oxy group (=O) as a divalent substituent.

Furthermore, $R^2$ of Formula (1) may be a group having an adamantane skeleton represented by Formula (I) below or an alicyclic hydrocarbon group having a norbornane skeleton represented by Formula (II) below.

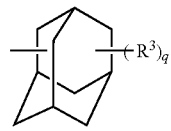

Formula (I)

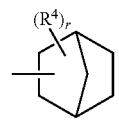

Formula (II)

$R^3$ and $R^4$ in Formula (I) or Formula (II) independently denote a substituent that may be bonded to any position on each of the alicyclic hydrocarbon structures. Furthermore, the q $R^3$s and the r $R^4$s may each be identical to or different from each other.

The q $R^3$s and the r $R^4$s may independently be a monovalent or polyvalent substituent; the monovalent substituent is preferably a hydrogen atom, a hydroxyl group, a substituted or unsubstituted amino group, a thiol group, a siloxane group, or an optionally substituted hydrocarbon group or heterocyclic group having a total of no greater than 30 carbons, and a divalent substituent is preferably an oxy group (=O).

The substitution number q for $R^3$ denotes an integer of 0 to 5, and the substitution number r for $R^4$ denotes an integer of 0 to 5.

Furthermore, one carbon atom of the adamantane framework in Formula (I) may be replaced by a carbonyl bond (—C(O)—) and/or an ester bond (—C(O)O—), and one carbon atom of the norbornane framework in Formula (II) may be replaced by an ether bond (—O—) and/or an ester bond (—C(O)O—).

The norbornane skeleton represented by Formula (II) may have a cyclic hydrocarbon structure represented by Formula (III). n in Formula (III) denotes a cyclic hydrocarbon structure whose opposite termini may substitute any positions of the norbornane skeleton, it may be a monocyclic structure or a polycyclic structure, and it may contain a carbonyl bond (—C(O)—) and/or an ester bond (—C(O)O—) in the cyclic hydrocarbon structure as well as the hydrocarbon bonds.

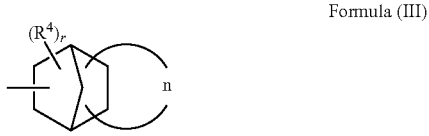

Formula (III)

The cyclic structure represented by Formula (III) above is preferably a structure represented by Formula (IV), Formula (V), or Formula (VI).

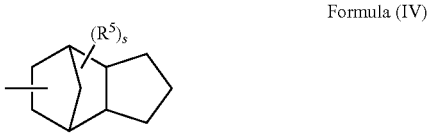

Formula (IV)

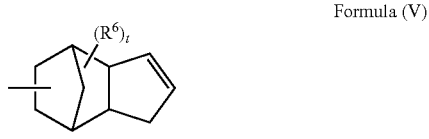

Formula (V)

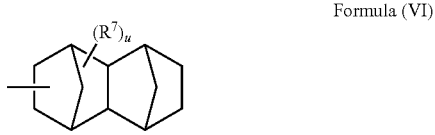

Formula (VI)

In Formula (IV), Formula (V), and Formula (VI), $R^5$, $R^6$, and $R^7$ independently denote a substituent, s, t, and u independently denote an integer of 0 to 5, and the s $R^5$s, the t $R^6$s, and the u $R^7$s may each be identical to or different from each other.

$X^1$ of Formula (1) may be bonded to any position on each of the alicyclic hydrocarbon structures shown below in Formula (IV), Formula (V), or Formula (VI).

$R^5$, $R^6$, and $R^7$ of Formula (IV), Formula (V), or Formula (VI) independently denote a substituent, and may be bonded to any position on each of the alicyclic hydrocarbon structures shown below in Formula (IV), Formula (V), or Formula (VI).

The substituents $R^5$, $R^6$, and $R^7$ have the same meanings as the substituents $R^3$ and $R^4$ of Formula (I) to Formula (III), and preferred ranges are also the same.

In the present invention, preferred examples of the acrylate group-, methacrylate group-, acrylamide group-, or methacrylamide group-containing monofunctional radically polymerizable monomer include monofunctional radically polymerizable monomers having a group having a cyclic structure such as a phenyl group, a naphthyl group, an anthracenyl group, a pyridinyl group, a tetrahydrofurfuryl group, a piperidinyl group, a cyclohexyl group, a cyclopentyl group, a cycloheptyl group, an isobornyl group, or a tricyclodecanyl group.

Preferred examples of the monofunctional radically polymerizable monomer that can be used in the present invention include norbornyl (meth)acrylate, isobornyl (meth)acrylate, cyclohexyl (meth)acrylate, cyclopentyl (meth)acrylate, cycloheptyl (meth)acrylate, cyclooctyl (meth)acrylate, cyclodecyl (meth)acrylate, dicyclodecyl (meth)acrylate, trimethylcyclohexyl (meth)acrylate, 4-t-butylcyclohexyl (meth)acrylate, acryloylmorpholine, 2-benzyl (meth)acrylate, phenoxyethyl (meth)acrylate, phenoxydiethylene glycol (meth)acrylate, phenoxytriethylene glycol (meth)acrylate, ethylene oxide-modified cresol (meth)acrylate (hereinafter, 'ethylene oxide' is also called 'EO'), tetrahydrofurfuryl (meth)acrylate, caprolactone-modified tetrahydrofurfuryl acrylate, nonylphenoxy polyethylene glycol (meth)acrylate, neopentyl glycol benzoate (meth)acrylate, paracumylphenoxyethylene glycol (meth)acrylate, N-phthalimidoethyl (meth)acrylate, pentamethylpiperidyl (meth)acrylate, tetramethylpiperidyl (meth)acrylate, N-cyclohexyl (meth)acrylamide, N-(1,1-dimethyl-2-phenyl)ethyl (meth)acrylamide, N-diphenylmethyl (meth)acrylamide, N-phthalimidomethyl (meth)acrylamide, N-(1,1'-dimethyl-3-(1,2,4-triazol-1-yl)) propyl (meth)acrylamide, 5-(meth)acryloyloxymethyl-5-ethyl-1,3-dioxacyclohexane, (poly)ethylene glycol (meth) acrylate phenyl ester, (poly)propylene glycol mono(meth) acrylate phenyl ester, and 2-hydroxy-3-phenoxypropyl acrylate.

Furthermore, preferred specific examples of the monofunctional radically polymerizable monomer that can be used in the present invention are shown in M-1 to M-55 below. In some of the compound examples below, a hydrocarbon chain is represented by a simplified structural formula in which symbols for carbon (C) and hydrogen (H) are omitted.

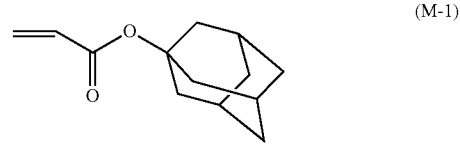

(M-1)

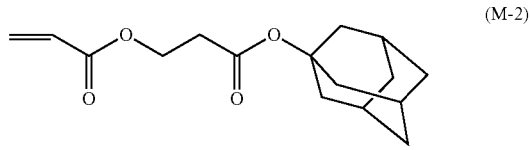

(M-2)

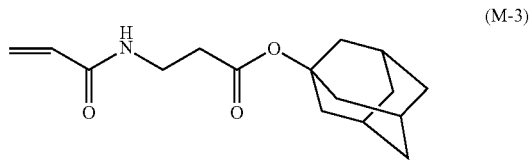

(M-3)

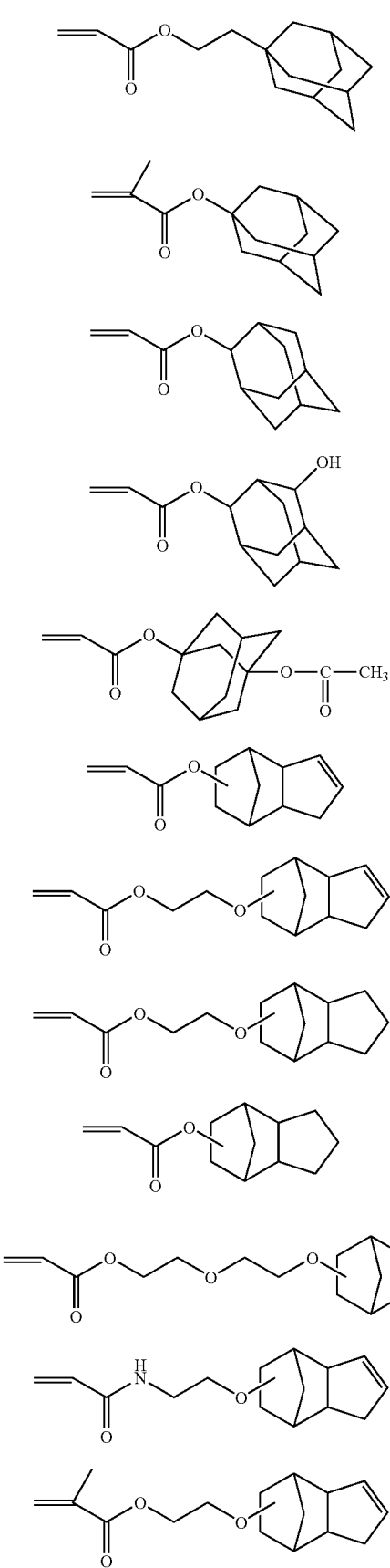
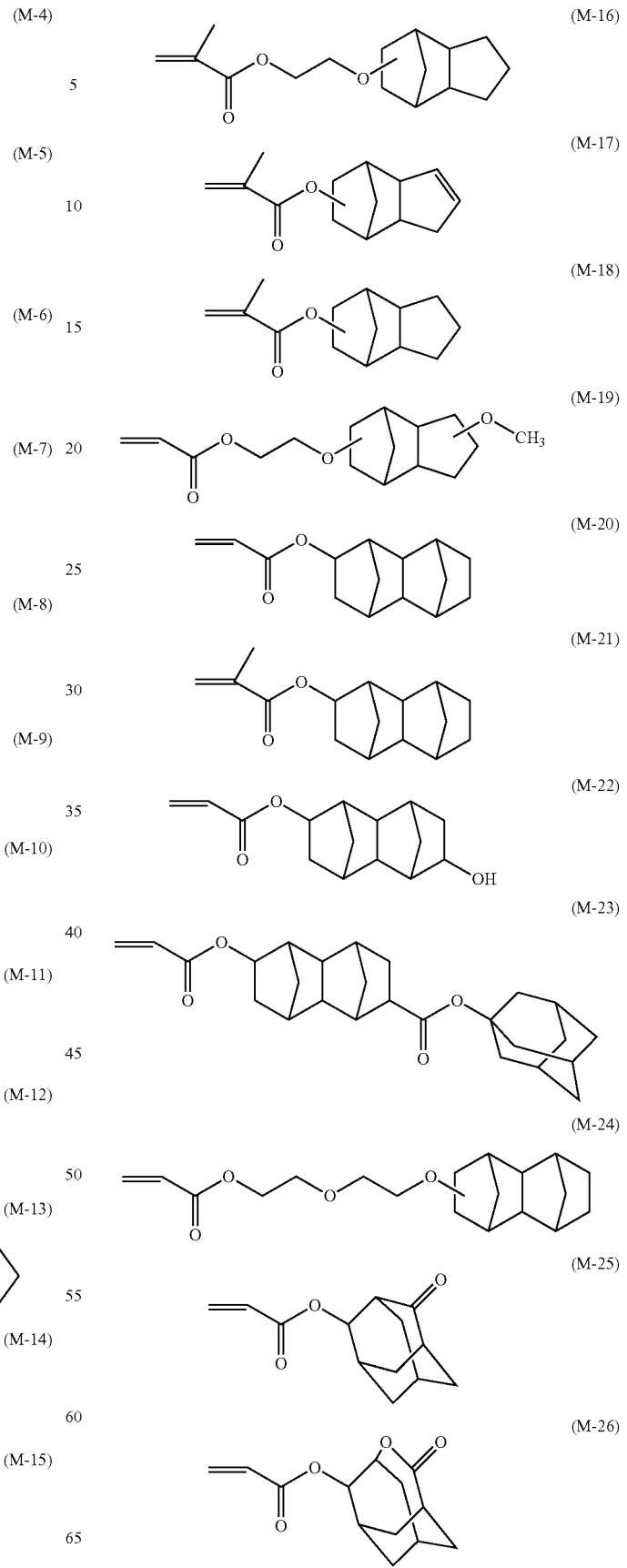

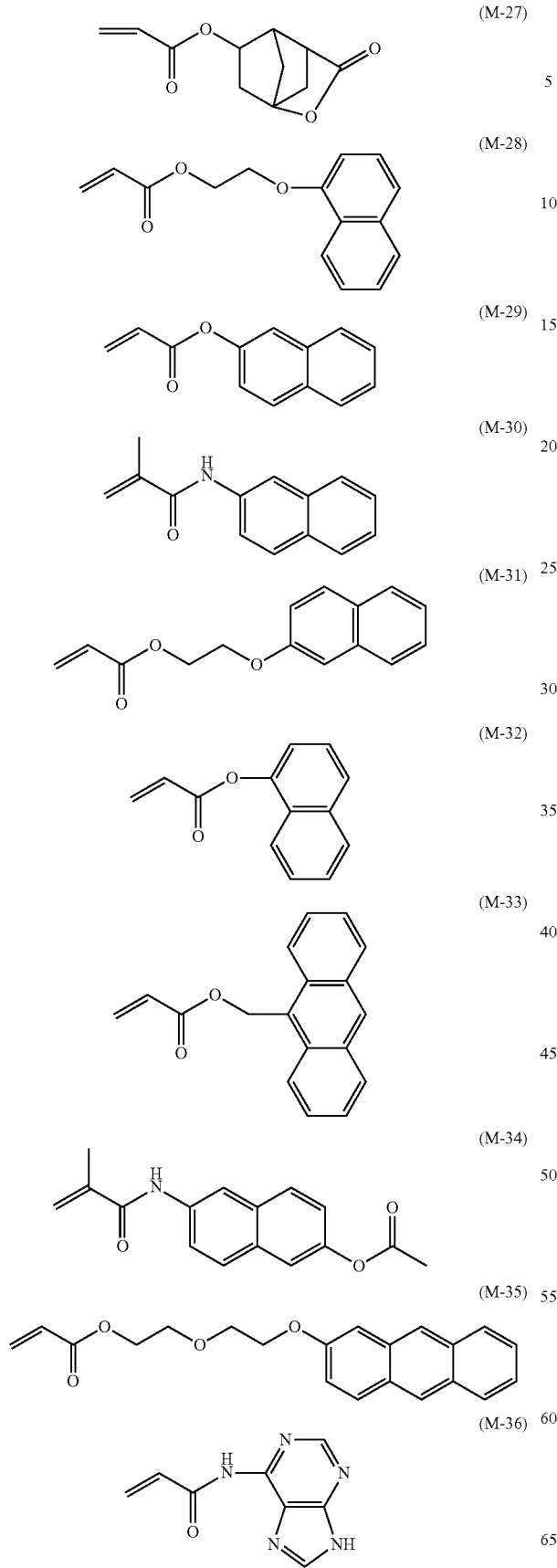
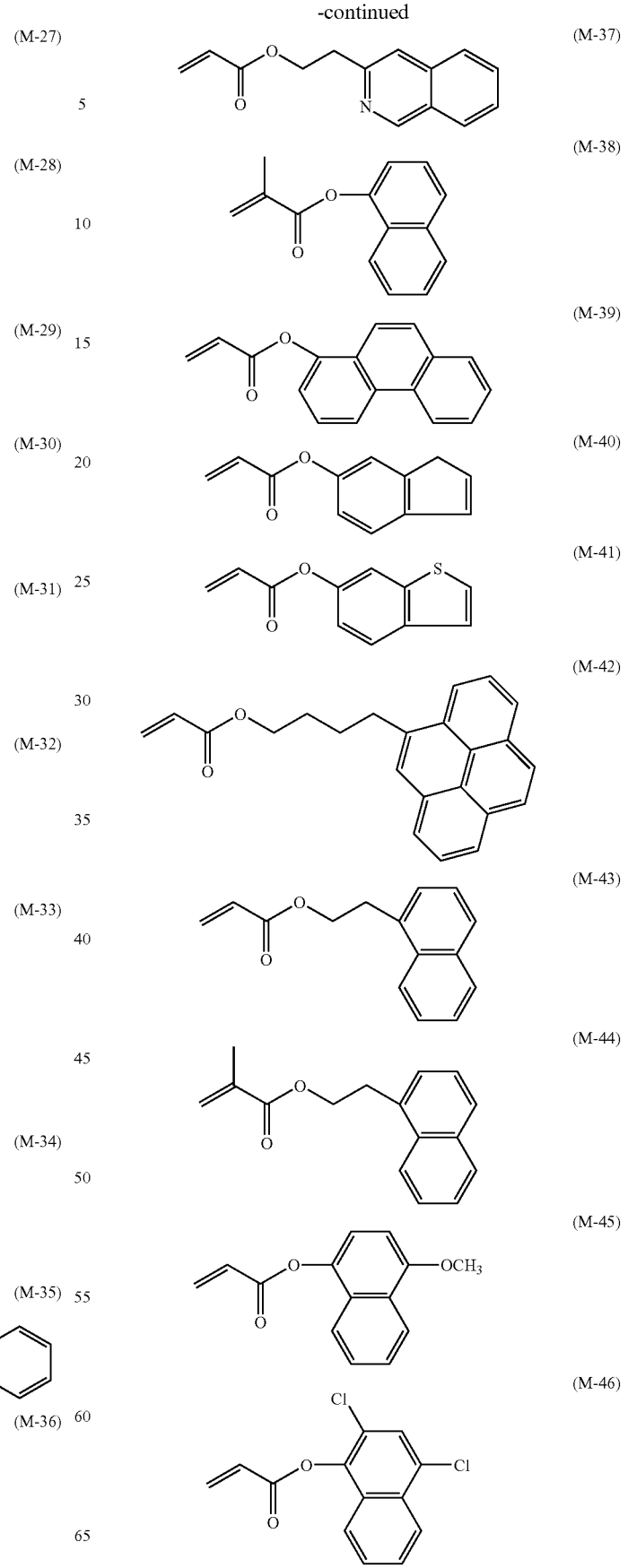

-continued (M-47) 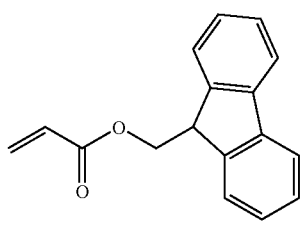

(M-48) 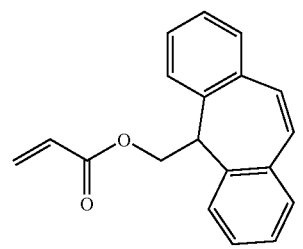

(M-49) 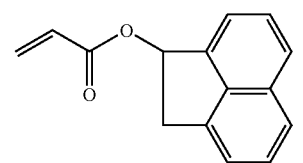

(M-50) 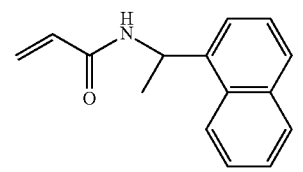

(M-51) 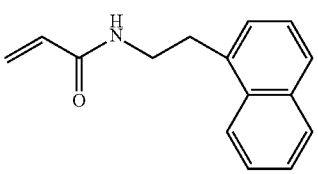

(M-52) 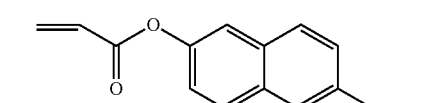

(M-53) 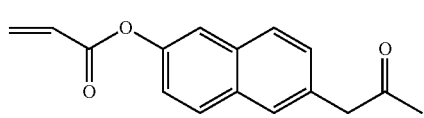

(M-54)
(M-55) 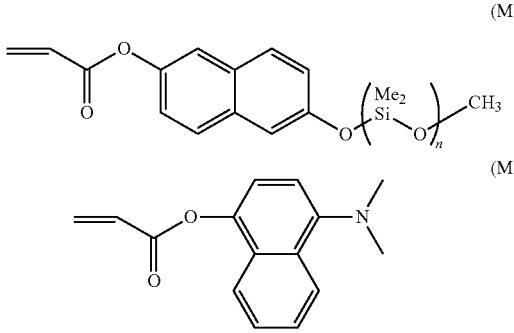

N-Vinyl Group-Containing Cyclic Monomer

In the present invention, it is preferable to use a monofunctional radically polymerizable monomer having an N-vinyl group and a cyclic structure-containing group. In particular, it is more preferable to use N-vinylcarbazole, 1-vinylimidazole, or an N-vinyllactam, and it is yet more preferable to use an N-vinyllactam.

Preferred examples of the N-vinyllactam that can be used in the present invention include compounds represented by Formula (2) below.

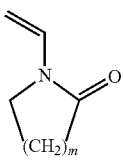

Formula (2)

In Formula (2), m denotes an integer of 1 to 5; m is preferably an integer of 2 to 4 from the viewpoints of flexibility after the ink composition is cured, adhesion to a support, and starting material availability, m is more preferably 2 or 4, and m is particularly preferably 4, which is N-vinylcaprolactam. N-Vinylcaprolactam is preferable since it has excellent safety, is commonly used and easily available at a relatively low price, and gives particularly good ink curability and adhesion of a cured film to a support.

The N-vinyllactam may have a substituent such as an alkyl group or an aryl group on the lactam ring, and may have a saturated or unsaturated ring structure bonded thereto. The N-vinyllactam above may be contained in the ink composition singly or in a combination of a plurality of types.

In the present invention, the ink composition comprises at least 60 wt % of the monofunctional radically polymerizable monomer having only one ethylenically unsaturated double bond group selected from the group consisting of an acrylate group, a methacrylate group, an acrylamide group, a methacrylamide group, and an N-vinyl group and having at least one cyclic structure-containing group, preferably comprises 60 to 90 wt %, and more preferably comprises 60 to 85 wt %. When the content is within the above-mentioned range, the ink composition has appropriate viscosity and excellent curability and gives a cured film that has a high level of stretchability that can allow deformation and has high abrasion resistance such that it does not stick to a mold and there are no scratches, cracks, or image dropouts during molding.

In the present invention, the ink composition preferably comprises the N-vinyllactam represented by Formula (2) at at least 10 wt % of the entire ink composition, more preferably 10 to 40 wt %, and yet more preferably 10 to 35 wt %.

When the amount of N-vinyllactam used is in the above-mentioned range, the curability, the flexibility of a cured film, and the adhesion to a support of a cured film are excellent. The N-vinyllactam is a compound having a relatively high melting point. It is preferable for the content of the N-vinyllactam to be no greater than 40 wt % since good solubility is exhibited even at a low temperature of 0° C. or less and the temperature range in which the ink composition can be handled becomes large.

Other Radically Polymerizable Monomer

As another radically polymerizable monomer, an acyclic monofunctional monomer or a polyfunctional monomer described below may be used in combination as necessary.

The acyclic monofunctional monomer has relatively low viscosity and may be used preferably for the purpose of, for example, decreasing the viscosity of the ink composition. However, from the viewpoint of suppressing stickiness of a cured film and giving a high film strength so that scratches, etc. do not occur during molding, the proportion of the acyclic monofunctional monomer below in the entire composition is preferably no greater than 20 wt %, and more preferably no greater than 15 wt %.

Specific examples of the acyclic monofunctional monomer include methyl methacrylate, n-butyl methacrylate, octyl (meth)acrylate, 2-ethylhexyl (meth)acrylate, 2-ethylhexyl diglycol (meth)acrylate, isooctyl (meth)acrylate, n-nonyl (meth)acrylate, decyl (meth)acrylate, dodecyl (meth)acrylate, tridecyl (meth)acrylate, tetradecyl (meth)acrylate, hexadecyl (meth)acrylate, octadecyl (meth)acrylate, 2-hydroxyethyl (meth)acrylate, 2-hydroxybutyl acrylate, butoxyethyl (meth)acrylate, carbitol (meth)acrylate, 2-ethylhexyl-diglycol (meth)acrylate, polyethylene glycol (meth)acrylate monomethyl ether, polypropylene glycol (meth)acrylate monomethyl ether, polytetramethylene glycol (meth)acrylate monomethyl ether, (poly)ethylene glycol (meth)acrylate methyl ester, (poly)ethylene glycol (meth)acrylate ethyl ester, (poly)propylene glycol (meth)acrylate methyl ester, (poly)propylene glycol (meth)acrylate ethyl ester, 2-acryloyloxyethylsuccinic acid, diacetone (meth)acrylamide, and N-methylol (meth)acrylamide.

As the radically polymerizable monomer, a polyfunctional monomer described below may be used in combination as necessary. By containing a polyfunctional monomer, an ink composition having excellent curability and high cured film strength is obtained. From the viewpoint of cured film stretchability suitable for molding being maintained, the proportion of the polyfunctional monomer in the entire ink composition is preferably no greater than 18.4 wt %, and more preferably no greater than 14.4 wt %.

Specific examples of the polyfunctional monomer include bis(4-(meth)acryloxypolyethoxyphenyl)propane, neopentyl glycol di(meth)acrylate, ethoxylated neopentyl glycol di(meth)acrylate, propoxylated neopentyl glycol di(meth)acrylate, 1,6-hexanediol di(meth)acrylate, 1,9-nonanediol di(meth)acrylate, 1,10-decanediol diacrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, polypropylene glycol di(meth)acrylate, pentaerythritol tri(meth)acrylate, pentaerythritol tetra(meth)acrylate, dipentaerythritol tetra(meth)acrylate, trimethylolethane tri(meth)acrylate, tri methylol propane tri(meth)acrylate, ditri-methylol propane tetra(meth)acrylate, tetramethylolmethane tetra(meth)acrylate, tetramethylolmethane tri(meth)acrylate, dimethyloltricyclodecane di(meth)acrylate, modified glycerol tri(meth)acrylate, modified bisphenol A di(meth)acrylate, bisphenol A propylene oxide adduct di(meth)acrylate (hereinafter, 'propylene oxide' is also called 'PO'), bisphenol A EO adduct di(meth)acrylate, dipentaerythritol hexa(meth)acrylate, caprolactone-modified dipentaerythritol hexa(meth)acrylate, (poly) tetramethylene glycol di(meth)acrylate, EO-modified pentaerythritol triacrylate, PO-modified pentaerythritol triacrylate, EO-modified pentaerythritol tetraacrylate, PO-modified pentaerythritol tetraacrylate, EO-modified dipentaerythritol tetraacrylate, PO-modified dipentaerythritol tetraacrylate, EO-modified trimethylolpropane triacrylate, PO-modified trimethylolpropane triacrylate, EO-modified tetramethylolmethane tetraacrylate, PO-modified tetramethylolmethane tetraacrylate, and hydroxypivalic acid neopentyl glycol di(meth)acrylate.

Other Radically Polymerizable Compound

In the present invention, in addition to the monofunctional radically polymerizable monomer represented by Formula (1), the N-vinyllactam represented by Formula (2), and said other radically polymerizable monomer, another radically polymerizable compound (hereinafter, also called simply a 'radically polymerizable compound', which needless to say means a radically polymerizable compound other than the monofunctional radically polymerizable monomer represented by Formula (1), the N-vinyllactam represented by Formula (2), and said other radically polymerizable monomer), may be contained.

It is preferable to use a radically polymerizable compound in combination since an ink composition having better curability can be provided. Examples of the radically polymerizable compound include photocurable materials employing photopolymerizable compositions described in JP-A-7-159983, JP-B-7-31399, JP-A-8-224982, JP-A-10-863, JP-A-9-80675, etc.

The radically polymerizable compound is a compound having a radically polymerizable ethylenically unsaturated bond, and may be any compound as long as it has at least one radically polymerizable ethylenically unsaturated bond in the molecule; examples thereof include those having a chemical configuration such as a monomer, an oligomer, or a polymer. One type of radically polymerizable compound may be used, or two or more types thereof may be used at any ratio in combination in order to improve an intended property.

Preferred examples of polymerizable compounds having a radically polymerizable ethylenically unsaturated bond include unsaturated carboxylic acids such as acrylic acid, methacrylic acid, itaconic acid, crotonic acid, isocrotonic acid, and maleic acid, and salts thereof, anhydrides having an ethylenically unsaturated group, acrylonitrile, styrene, and various types of unsaturated polyesters, unsaturated polyethers, unsaturated polyamides, and (meth)acrylic acid esters of unsaturated urethane (meth)acrylic monomers or prepolymers, epoxy monomers or prepolymers, or urethane monomers or prepolymers.

Specific examples thereof include acrylic acid derivatives such as (poly)ethylene glycol mono(meth)acrylate, (poly)ethylene glycol (meth)acrylate methyl ester, (poly)ethylene glycol (meth)acrylate ethyl ester, (poly)ethylene glycol (meth)acrylate phenyl ester, (poly)propylene glycol mono(meth)acrylate, (poly)propylene glycol mono(meth)acrylate phenyl ester, (poly)propylene glycol (meth)acrylate methyl ester, (poly)propylene glycol (meth)acrylate ethyl ester, neopentyl glycol di(meth)acrylate, (poly)ethylene glycol di(meth)acrylate, (poly)tetramethylene glycol di(meth)acrylate, (poly)tetramethylene glycol di(meth)acrylate, bisphenol A PO adduct di(meth)acrylate, ethoxylated neopentyl glycol diacrylate, propoxylated neopentyl glycol diacrylate, bisphenol A EO adduct di(meth)acrylate, EO-modified pentaerythritol triacrylate, PO-modified pentaerythritol triacrylate, EO-modified pentaerythritol tetraacrylate, PO-modified pentaerythritol tetraacrylate, EO-modified dipentaerythritol tetraacrylate, PO-modified dipentaerythritol tetraacrylate, EO-modified trimethylolpropane triacrylate, PO-modified trimethylol propane triacrylate, EO-modified tetramethylolmethane tetraacrylate, PO-modified tetramethylolmethane tetraacrylate, 2-ethylhexyl acrylate, n-octyl acrylate, n-nonyl acrylate, n-decyl acrylate, isooctyl acrylate, n-lauryl acrylate, n-tridecyl acrylate, n-cetyl acrylate, n-stearyl acrylate, 2-hydroxyethyl acrylate, butoxyethyl acrylate, tetrahydrofurfuryl acrylate, benzyl acrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylolacrylamide, diacetone acrylamide, and epoxy acrylate, methacrylic derivatives such as methyl methacrylate, n-butyl methacrylate, 2-ethylhexyl methacrylate, n-octyl methacrylate, n-nonyl methacrylate, n-decyl methacrylate, isooctyl methacrylate, n-lauryl methacrylate, n-tridecyl methacrylate, n-cetyl methacrylate, n-stearyl methacrylate, allyl methacrylate, glycidyl methacrylate, benzyl methacrylate, dimethylaminomethyl methacrylate, trimethylolethane trimethacrylate, trimethylolpropane trimethacrylate, and 2,2-bis(4-methacryloxypolyethoxyphenyl)propane, allyl compound derivatives such as allyl glycidyl ether, diallyl phthalate, and triallyl trimellitate, 1,6-hexanediol diacrylate, 1,9-nonanediol diacrylate, 1,10-decanediol diacrylate, 2-ethylhexyl diglycol acrylate, 2-hydroxy-3-phenoxypropyl acrylate, 2-hydroxybutyl acrylate, hydroxypivalic acid neopentyl glycol diacrylate, 2-acryloyloxyethylphthalic acid, tetramethylolmethane triacrylate, 2-acryloyloxyethyl-2-hydroxyethylphthalic acid, dimethyloltricyclodecane diacrylate, ethoxylated phenyl acrylate, 2-acryloyloxyethylsuccinic acid, modified glycerol triacrylate, bisphenol A diglycidyl ether acrylic acid adduct, modified bisphenol A diacrylate, 2-acyloyloxyethylhexahydrophthalic acid, dipentaerythritol hexaacrylate, pentaerythritol triacrylate tolylene diisocyanate urethane prepolymer, lactone-modified flexible acrylate, butoxyethyl acrylate, pentaerythritol triacrylate hexamethylene diisocyanate urethane prepolymer, 2-hydroxyethyl acrylate, methoxydipropylene glycol acrylate, ditrimethylolpropane tetraacrylate, and pentaerythritol triacrylate hexamethylene diisocyanate urethane prepolymer and, more specifically, commercial products, radically polymerizable or crosslinking monomers, oligomers, and polymers known in the art such as those described in 'Kakyozai Handobukku' (Crosslinking Agent Handbook), Ed. S. Yamashita (Taiseisha, 1981); 'UV•EB Koka Handobukku' (UV•EB Curing Handbook (Starting Materials)) Ed. K. Kato (Kobunshi Kankoukai, 1985); 'UV•EB Koka Gijutsu no Oyo to Shijyo' (Application and Market of UV•EB Curing Technology', p. 79, Ed. RadTech (CMC, 1989); and E. Takiyama 'Poriesuteru Jushi Handobukku' (Polyester Resin Handbook), (The Nikkan Kogyo Shimbun Ltd., 1988).

Furthermore, as the radically polymerizable compound, a vinyl ether compound is preferably used. Examples of vinyl ether compounds that can suitably be used include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether, and monovinyl ether compounds such as ethylene glycol monovinyl ether, triethylene glycol monovinyl ether, hydroxyethylmonovinyl ether, hydroxynonylmonovinyl ether, ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl vinyl ether, dodecyl vinyl ether, diethylene glycol monovinyl ether, and octadecyl vinyl ether.

Among these vinyl ether compounds, divinyl ether compounds and trivinyl ether compounds are preferable from the viewpoint of curability, adhesion, and surface hardness, and divinyl ether compounds are particularly preferable. The vinyl ether compound may be used singly or in a combination of two or more types as appropriate.

In the present invention, the monomers listed above as the above-mentioned polymerizable compounds have high reactivity, low viscosity, and excellent adhesion to a recording medium.

The content of said other radically polymerizable compound in the ink composition is preferably at least 1 wt % but no greater than 70 wt %, and more preferably at least 1 wt % but no greater than 60 wt %.

In the present invention, an oligomer or a polymer may be used in combination. The oligomer referred to here means a compound having a molecular weight (a weight-average molecular weight for one having a molecular weight distribution) of 2,000 or greater, and the polymer referred to means a compound having a molecular weight (a weight-average molecular weight for one having a molecular weight distribution) of 10,000 or greater. The oligomer and the polymer optionally have a radically polymerizable group. It is preferable for the oligomer and the polymer to have no more than 4 radically polymerizable groups per molecule (an average of no more than 4 over all the molecules contained for one having a molecular weight distribution) since an ink composition having excellent flexibility can be obtained. They can suitably be used from the viewpoint of adjusting the viscosity to an optimum level for jetting the ink.

Radical Polymerization Initiator

In the present invention, the ink composition preferably comprises a radical polymerizaition initiator.

As a polymerization initiator that can be used in the present invention, a known radical polymerization initiator may be used. The polymerization initiator that can be used in the present invention may be used singly or in a combination of two or more types.

The radical polymerization initiator that can be used in the ink composition in the present invention is a compound that forms a radical polymerization initiating species by absorbing external energy. The external energy used for initiating polymerization can be broadly divided into heat and actinic radiation, and a thermal polymerization initiator and a photopolymerization initiator are used respectively. Examples of the actinic radiation include γ rays, β rays, an electron beam, ultraviolet rays, visible light, and infrared rays.

Examples of the radical polymerization initiator that can be used in the present invention include (a) an aromatic ketone, (b) an acylphosphine compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon-halogen bond, and (m) an alkylamine compound. With regard to these radical polymerization initiators, the above-mentioned compounds (a) to (m) may be used singly or in combination. The radical polymerization initiator in the present invention may suitably be used singly or in a combination of two or more types.

Preferred examples of the aromatic ketone (a), the acylphosphine compound (b), and the thio compound (e) include a compound having a benzophenone skeleton (benzophenone compound) or a compound having a thioxanthone skeleton (thioxanthone compound) described in 'RADIATION CURING IN POLYMER SCIENCE AND TECHNOLOGY' J. P. FOUASSIER and J. F. RABEK (1993), pp. 77 to 117. Preferred examples of the aromatic ketone (a), the acylphosphine compound (b) and the thio compound (e) include an α-thiobenzophenone compound described in JP-B-47-6416, a benzoin ether compound described in JP-B-47-3981, an α-substituted benzoin compound described in JP-B-47-22326, a benzoin derivative described in JP-B-47-23664, an aroylphosphonic acid ester described in JP-A-57-30704, a dialkoxybenzophenone described in JP-B-60-26483, benzoin ethers described in JP-B-60-26403 and JP-A-62-81345, α-aminobenzophenones described in JP-B-1-

34242, U.S. Pat. No. 4,318,791, and EP No. 0284561A1, p-di(dimethylaminobenzoyl)benzene described in JP-A-2-211452, a thio-substituted aromatic ketone described in JP-A-61-194062, an acylphosphine sulfide described in JP-B-2-9597, an acylphosphine described in JP-B-2-9596, a thioxanthone described in JP-B-63-61950, and a coumarin described in JP-B-59-42864.

Examples of the benzophenone compound include benzophenone, 4-phenylbenzophenone, isophthalophenone, and 4-benzoyl-4'-methylphenylsulfide. Examples of the thioxanthone compound include 2,4-diethylthioxanthone, 2-isopropylthioxanthone, and 2-chlorothioxanthone.

In the present invention, the aromatic ketone (a) is preferably an α-hydroxyketone, and examples thereof include 1-[4-(2-hydroxyethoxy)phenyl]-2-hydroxy-2-methyl-1-propan-1-one, 2-hydroxy-2-methyl-1-phenylpropan-1-one, and 1-hydroxycyclohexyl phenyl ketone.

Among them, the aromatic ketone (a) is particularly preferably a 1-hydroxycyclohexyl phenyl ketone compound. The 1-hydroxycyclohexyl phenyl ketone compound referred to in the present invention means 1-hydroxycyclohexyl phenyl ketone and a compound obtained by substituting 1-hydroxycyclohexyl phenyl ketone with any substituent. The substituent may be selected freely from a range that enables an ability as a radical polymerization initiator to be exhibited, and specific examples thereof include an alkyl group (e.g. a methyl group, an ethyl group, a propyl group, a butyl group, etc.).

In the present invention, the acylphosphine compound (b) is preferably an acylphosphine oxide compound.

Examples of the acylphosphine oxide compound include a compound having a structure represented by Formula (7) or (8).

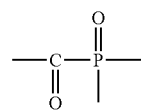

Formula (7)

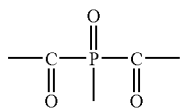

Formula (8)

The acylphosphine oxide compound is particularly preferably one having a chemical structure represented by Formula (9) or (10).

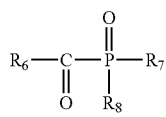

Formula (9)

(In the formula, $R_6$, $R_7$, and $R_8$ denote an aromatic hydrocarbon group, which may have a methyl group or an ethyl group as a substituent.)

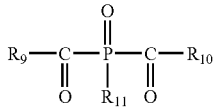

Formula (10)

(In the formula, $R_9$, $R_{10}$, and $R_{11}$ denote an aromatic hydrocarbon group, which may have a methyl group or an ethyl group as a substituent.)

As the acylphosphine oxide compound, a monoacylphosphine oxide compound, a bisacylphosphine oxide compound, etc. may be used, and as the monoacylphosphine oxide compound, a known monoacylphosphine oxide compound may be used. Examples thereof include monoacylphosphine oxide compounds described in JP-B-60-8047 and JP-B-63-40799. Specific examples thereof include methyl isobutyryl methylphosphinate, methyl isobutyrylphenylphosphinate, methyl pivaloylphenylphosphinate, methyl 2-ethylhexanoylphenylphosphinate, isopropyl pivaloylphenylphosphinate, methyl p-tolylphenylphosphinate, methyl o-tolylphenylphosphinate, methyl 2,4-dimethylbenzoylphenylphosphinate, isopropyl p-t-butylbenzoylphenylphosphinate, methyl acryloylphenylphosphinate, isobutyryldiphenylphosphine oxide, 2-ethylhexanoyldiphenylphosphine oxide, o-tolyldiphenylphosphine oxide, p-t-butylbenzoyldiphenylphosphine oxide, 3-pyridylcarbonyldiphenylphosphine oxide, acryloyldiphenylphosphine oxide, benzoyldiphenylphosphine oxide, vinyl pivaloylphenylphosphinate, adipoyl-bis-diphenylphosphine oxide, pivaloyldiphenylphosphine oxide, p-tolyldiphenylphosphine oxide, 4-(t-butyl)benzoyldiphenylphosphine oxide, terephthaloyl-bis-diphenylphosphine oxide, 2-methylbenzoyldiphenylphosphine oxide, versatoyldiphenylphosphine oxide, 2-methyl-2-ethylhexanoyldiphenylphosphine oxide, 1-methylcyclohexanoyldiphenylphosphine oxide, methyl pivaloylphenylphosphinate, and isopropyl pivaloylphenylphosphinate.

As the bisacylphosphine oxide compound, a known bisacylphosphine oxide compound may be used. Examples thereof include bisacylphosphine oxide compounds described in JP-A-3-101686, JP-A-5-345790, and JP-A-6-298818. Specific examples thereof include bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis(2,6-dichlorobenzoyl)decylphosphine oxide, bis(2,6-dichlorobenzoyl)-4-octylphenylphosphine oxide, bis(2,4,6-trimethylbenzoyl)phenylphosphine oxide, bis(2,4,6-trimethylbenzoyl)-2,5-dimethylphenylphosphine oxide, bis(2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis(2-methyl-1-naphthoyl)-4-propylphenylphosphine oxide, bis(2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and bis(2,6-dimethoxybenzoyl)-2,4,4-trimethylpentylphosphine oxide.

Among them, preferred examples of the acylphosphine oxide compound in the present invention include bis(2,4,6-trimethylbenzoyl)phenylphosphine oxide (IRGACURE 819: manufactured by Ciba Specialty Chemicals), bis(2,6-dimethoxybenzoyl)-2,4,4-trimethylpentylphenylphosphine oxide, and 2,4,6-trimethylbenzoyldiphenylphosphine oxide (Darocur TPO: manufactured by Ciba Specialty Chemicals, Lucirin TPO: manufactured by BASF).

As the aromatic onium salt compound (c), there can be cited aromatic onium salts of elements of Groups 15, 16, and 17 of the periodic table, specifically, N, P, As, Sb, Bi, O, S, Se, Te, and I. Examples thereof include iodonium salts described in EP No. 104143, U.S. Pat. No. 4,837,124, JP-A-2-150848, and JP-A-2-96514, diazonium salts (optionally substituted benzenediazoniums, etc.) described in EP Nos. 370693, 233567, 297443, 297442, 279210, and 422570, U.S. Pat. Nos. 3,902,144, 4,933,377, 4,760,013, 4,734,444, and 2,833,827, diazonium salt resins (diazodiphenylamine formaldehyde resins, etc.), N-alkoxypyridinium salts, etc. (e.g. those described in U.S. Pat. No. 4,743,528, JP-A-63-138345, JP-A-63-142345, JP-A-63-142346, and JP-B-46-42363; specific examples thereof include 1-methoxy-4-phenylpyridinium tetrafluoroborate); furthermore, compounds described in JP-B-52-147277, 52-14278, and 52-14279 may suitably be used. A radical or an acid is formed as an active species.

As the organic peroxide (d), almost all organic compounds having at least one oxygen-oxygen bond per molecule can be cited, and preferred examples thereof include peroxide ester compounds such as 3,3',4,4'-tetra(t-butylperoxycarbonyl)benzophenone, 3,3',4,4'-tetra(t-amylperoxycarbonyl)benzophenone, 3,3',4,4'-tetra(t-hexylperoxycarbonyl)benzophenone, 3,3',4,4'-tetra(t-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone, and di-t-butyldiperoxyisophthalate.

As the hexaarylbiimidazole compound (f), there can be cited lophine dimers described in JP-B-45-37377 and JP-B-44-86516, and examples thereof include 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis(o-trifluorophenyl)-4,4',5,5'-tetraphenylbiimidazole.

As the ketoxime ester compound (g), there can be cited 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one, and 2-ethoxycarbonyloxyimino-1-phenylpropan-1-one.

Examples of the borate compound (h) include compounds described in U.S. Pat. Nos. 3,567,453 and 4,343,891, and EP Nos. 109,772 and 109,773.

Examples of the azinium salt compound (i) include N—O bond-containing compounds described in JP-A-63-138345, JP-A-63-142345, JP-A-63-142346, JP-A-63-143537, and JP-B-46-42363.

Examples of the metallocene compound (j) include titanocene compounds described in JP-A-59-152396, JP-A-61-151197, JP-A-63-41484, JP-A-2-249, and JP-A-2-4705, and iron-arene complexes described in JP-A-1-304453 and JP-A-1-152109.

Specific examples of the titanocene compound include dichlorobis(cyclopentadienyl)titanium, bis(cyclopentadienyl)bis(phenyl)titanium, bis(cyclopentadienyl)bis(2,3,4,5,6-pentafluorophen-1-yl)titanium, bis(cyclopentadienyl)bis(2,3,5,6-tetrafluorophen-1-yl)titanium, bis(cyclopentadienyl)bis(2,4,6-trifluorophen-1-yl)titanium, bis(cyclopentadienyl)bis(2,6-difluorophen-1-yl)titanium, bis(cyclopentadienyl)bis(2,4-difluorophen-1-yl)titanium, bis(methylcyclopentadienyl)bis(2,3,4,5,6-pentafluorophen-1-yl)titanium, bis(methylcyclopentadienyl)bis(2,3,5,6-tetrafluorophen-1-yl)titanium, bis(methylcyclopentadienyl)bis(2,4-difluorophen-1-yl)titanium, bis(cyclopentadienyl)bis[2,6-difluoro-3-(pyrr-1-yl)phenyl]titanium, bis(cyclopentadienyl)bis[2,6-difluoro-3-(methylsulfonamido)phenyl]titanium, and bis(cyclopentadienyl)bis[2,6-difluoro-3-(N-butylbiaroylamino)phenyl]titanium.

Examples of the active ester compound (k) include nitrobenzyl ester compounds described in EP Nos. 0290750, 046083, 156153, 271851, and 0388343, U.S. Pat. Nos. 3,901,710 and 4,181,531, JP-A-60-198538, and JP-A-53-133022, iminosulfonate compounds described in EP Nos. 0199672, 84515, 199672, 044115, and 0101122, U.S. Pat. Nos. 4,618,564, 4,371,605, and 4,431,774, JP-A-64-18143, JP-A-2-245756, and JP-A-4-365048, and compounds described in JP-B-62-6223, JP-B-63-14340, and JP-A-59-174831.

Preferred examples of the compound (I) having a carbon-halogen bond include a compound described in Wakabayashi et. al, Bull. Chem. Soc. Japan, 42, 2924 (1969), a compound described in British Patent No. 1388492, a compound described in JP-A-53-133428, and a compound described in German Patent No. 3337024.

Examples further include a compound described in F. C. Schaefer et al., J. Org. Chem., 29, 1527 (1964), a compound described in JP-A-62-58241, a compound described in JP-A-5-281728, a compound described in German Pat. No. 2641100, a compound described in German Pat. No. 3333450, compounds described in German Pat. No. 3021590, and compounds described in German Pat. No. 3021599.

The total amount of radical polymerization initiator used in the ink composition is preferably 0.01 to 35 wt % relative to the total amount of polymerizable compound used, including the monofunctional radically polymerizable monomers represented by Formulae (1) and (2) and a radically polymerizable compound, which is described later, is more preferably 0.5 to 20 wt %, and is yet more preferably 1.0 to 15 wt %. The ink composition can be cured with 0.01 wt % or greater of the polymerization initiator, and a cured film having a uniform degree of curing can be obtained with 35 wt % or less.

Furthermore, in the present invention, when a sensitizer, which will be described later, is used in the ink composition, the total amount of radical polymerization initiator used relative to the sensitizer is preferably 200:1 to 1:200 as a radical polymerization initiator: sensitizer ratio by weight, is more preferably 50:1 to 1:50, and is yet more preferably 20:1 to 1:5.

Colorant

In the present invention, the ink composition may contain a colorant in order to improve the visibility of a formed image area.

The coloring agent that can be used in the present invention is not particularly limited, but a pigment and an oil-soluble dye that have excellent weather resistance and rich color reproduction are preferable, and it may be selected from any known coloring agent such as a soluble dye. It is preferable that the coloring agent that can be suitably used in the ink composition or the inkjet recording ink composition of the present invention does not function as a polymerization inhibitor in a polymerization reaction, which is a curing reaction. This is because the sensitivity of the curing reaction by actinic radiation should not be degraded.

The pigment that can be used in the present invention is not particularly limited and, for example, organic and inorganic pigments having the numbers below described in the Color Index may be used.

That is, as a red or magenta pigment, Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36;

as a blue or cyan pigment, Pigment Blue 1, 15, 15:1, 15:2, 15:3, 15:4, 15:6, 16, 17-1, 22, 27, 28, 29, 36, or 60;

as a green pigment, Pigment Green 7, 26, 36, or 50;

as a yellow pigment, Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, or 193;

as a black pigment,

Pigment Black 7, 28, or 26; as a white pigment,

Pigment White 6, 18, or 21, etc. may be used according to the intended application.

The oil-soluble dye that can be used in the present invention is explained below.

The oil-soluble dye that can be used in the present invention means a dye that is substantially insoluble in water. Specifically, the solubility in water at 25° C. (the mass of dye that can be dissolved in 100 g of water) is no greater than 1 g, preferably no greater than 0.5 g, and more preferably no greater than 0.1 g. Therefore, the oil-soluble dye means a so-called water-insoluble pigment or an oil-soluble dye, and among these the oil-soluble dye is preferable.

Among the oil-soluble dyes that can be used in the present invention, as a yellow dye, any may be used. Examples thereof include aryl or heteryl azo dyes having a coupling component such as a phenol, a naphthol, an aniline, a pyrazolone, a pyridone, or an open-chain active methylene compound; azomethine dyes having a coupling component such as an open-chain active methylene compound; methine dyes such as benzylidene dyes and monomethineoxonol dyes; quinone dyes such as naphthoquinone dyes and anthraquinone dyes; and other dye species such as quinophthalone dyes, nitro/nitroso dyes, acridine dyes, and acridinone dyes.

Among the above-mentioned oil-soluble dyes that can be used in the present invention, as a magenta dye, any may be used. Examples thereof include aryl or heteryl azo dyes having a coupling component such as a phenol, a naphthol, or an aniline; azomethine dyes having a coupling component such as a pyrazolone or a pyrazolotriazole; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, or anthrapyridones; and condensed polycyclic dyes such as dioxazine dyes.

Among the oil-soluble dyes that can be used in the present invention, as a cyan dye, any may be used. Examples thereof include indoaniline dyes, indophenol dyes, and azomethine dyes having a coupling component such as a pyrrolotriazole; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes having a coupling component such as a phenol, a naphthol, or an aniline; and indigo/thioindigo dyes.

The above-mentioned dyes may be dyes that exhibit respective colors of yellow, magenta, and cyan only after a part of the chromophore dissociates, and in that case the counter cation may be an inorganic cation such as an alkali metal or ammonium, may be an organic cation such as pyridinium or a quaternary ammonium salt, or may be a polymer cation having the above cation as a partial structure.

Although not limited to the following, preferred specific examples thereof include Cl Solvent Black 3, 7, 27, 29, and 34; Cl Solvent Yellow 14, 16, 19, 29, 30, 56, 82, 93, and 162; Cl Solvent Red 1, 3, 8, 18, 24, 27, 43, 49, 51, 72, 73, 109, 122, 132, and 218; Cl Solvent Violet 3; Cl Solvent Blue 2, 11, 25, 35, 38, 67, and 70; Cl Solvent Green 3 and 7; and Cl Solvent Orange 2.

Particularly preferred examples thereof include Nubian Black PC-0850, Oil Black HBB, Oil Yellow 129, Oil Yellow 105, Oil Pink 312, Oil Red 5B, Oil Scarlet 308, Vali Fast Blue 2606, Oil Blue BOS (manufactured by Orient Chemical Industries, Ltd.), Aizen Spilon Blue GNH (manufactured by Hodogaya Chemical Co., Ltd.), Neopen Yellow 075, Neopen Magenta SE1378, Neopen Blue 808, Neopen Blue FF4012, and Neopen Cyan FF4238 (manufactured by BASF).

In the present invention, the oil-soluble dye may be used singly or in a combination of two or more types.

Furthermore, when the oil-soluble dye is used as a colorant, another colorant such as a water-soluble dye, a disperse dye, or a pigment may be contained as necessary in a range that does not interfere with the effects of the present invention.

In the present invention, a disperse dye may be used in a range that enables it to be dissolved in a water-immiscible organic solvent. Disperse dyes generally include water-soluble dyes, but in the present invention it is preferable for the disperse dye to be used in a range such that it dissolves in a water-immiscible organic solvent. Specific preferred examples of the disperse dye include Cl Disperse Yellow 5, 42, 54, 64, 79, 82, 83, 93, 99, 100, 119, 122, 124, 126, 160, 184:1, 186, 198, 199, 201, 204, 224, and 237; Cl Disperse Orange 13, 29, 31:1, 33, 49, 54, 55, 66, 73, 118, 119, and 163; Cl Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; Cl Disperse Violet 33; Cl Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and Cl Disperse Green 6:1 and 9.

The colorant that can be used in the present invention is preferably added to the ink composition or the inkjet recording ink composition of the present invention and then dispersed in the ink to an appropriate degree. For dispersion of the coloring agent, for example, a dispersing machine such as a ball mill, a sand mill, an attritor, a roll mill, an agitator, a Henschel mixer, a colloidal mill, an ultrasonic homogenizer, a pearl mill, a wet type jet mill, or a paint shaker may be used.

The colorant may be added directly to the ink composition of the present invention, but in order to improve dispersibility it may be added in advance to a solvent or a dispersing medium such as a radically polymerizable compound used in the present invention.

In the present invention, in order to avoid the problem of the solvent resistance being degraded when the solvent remains in the cured image and the VOC (Volatile Organic Compound) problem of the residual solvent, it is preferable to add the colorant in advance to a dispersing medium such as a radically polymerizable compound. As a polymerizable compound used, it is preferable in terms of dispersion suitability to select a monomer having the lowest viscosity.

These colorants may be used by appropriately selecting one type or two or more types according to the intended purpose of the ink composition.

When a colorant such as a pigment that is present as a solid in the ink composition of the present invention is used, it is preferable for the colorant, the dispersant, the dispersing medium, dispersion conditions, and filtration conditions to be set so that the average particle size of colorant particles is preferably 0.005 to 0.5 µm, more preferably 0.01 to 0.45 µm, and yet more preferably 0.015 to 0.4 µm. By such control of particle size, clogging of a head nozzle can be suppressed, and the ink storage stability, the ink transparency, and the curing sensitivity can be maintained.

The content of the colorant in the ink composition of the present invention is appropriately selected according to the color and the intended purpose, and is generally preferably 0.01 to 30 wt % relative to the weight of the entire ink composition.

Dispersant

It is preferable to add a dispersant when dispersing the colorant. The type of dispersant is not particularly limited, but it is preferable to use a polymeric dispersant.

Examples of the polymeric dispersant include polymeric dispersants such as DisperBYK-101, DisperBYK-102, DisperBYK-103, DisperBYK-106, DisperBYK-111, DisperBYK-161, DisperBYK-162, DisperBYK-163, DisperBYK-164, DisperBYK-166, DisperBYK-167, DisperBYK-168, DisperBYK-170, DisperBYK-171, DisperBYK-174, and DisperBYK-182 (all manufactured by BYK Chemie), EFKA4010, EFKA4046, EFKA4080, EFKA5010, EFKA5207, EFKA5244, EFKA6745, EFKA6750, EFKA7414, EFKA7462, EFKA7500, EFKA7570, EFKA7575, and EFKA7580 (all manufactured by EFKA Additives), Disperse Aid 6, Disperse Aid 8, Disperse Aid 15, and Disperse Aid 9100 (manufactured by San Nopco Limited); various types of Solsperse dispersants such as Solsperse 3000, 5000, 9000, 12000, 13240, 13940, 17000, 24000, 26000, 28000, 32000, 36000, 39000, 41000, and 71000 (manufactured by Avecia); Adeka Pluronic L31, F38, L42, L44, L61, L64, F68, L72, P95, F77, P84, F87, P94, L101, P103, F108, L121, and P-123 (manufactured by Adeka Corporation), Isonet S-20 (manufactured by Sanyo Chemical Industries, Ltd.), and Disparlon KS-860, 873SN, and 874 (polymeric dispersant), #2150 (aliphatic poly carboxylic acid), and #7004 (polyether ester type) (manufactured by Kusumoto Chemicals, Ltd.).

It is also possible to use in combination a pigment derivative such as a phthalocyanine derivative (product name: EFKA-745 (manufactured by EFKA)), or Solsperse 5000, 12000, or 22000 (manufactured by Avecia).

In the present invention, the content of the dispersant in the ink composition is appropriately selected according to the intended purpose, and is preferably 0.01 to 5 wt % relative to the weight of the entire ink composition.

Surfactant

In the present invention, It is preferable to add a surfactant to the ink composition in order to impart long-term discharge stability.

As the surfactant, those described in JP-A-62-173463 and JP-A-62-183457 can be cited. Examples thereof include anionic surfactants such as dialkylsulfosuccinic acid salts, alkylnaphthalenesulfonic acid salts, and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkylamine salts and quaternary ammonium salts.

An organofluoro compound may be used as the above-mentioned surfactant. The organofluoro compound is preferably hydrophobic. Examples of the organofluoro compound include fluorine-based surfactants, oil-like fluorine-based compounds (e.g. fluorine oils), solid fluorine compound resins (e.g. tetrafluoroethylene resin), and those described in JP-B-57-9053 (columns 8 to 17) and JP-A-62-135826.

A silicone surfactants such as a polyether-modified polydimethylsiloxane, and a polyether-modified hydoroxy group containing polydimethylsiloxane can be used in the present invention. Examples of the silicone surfactants include BYK-306, BYK-307, BYK-308, BYK-310, BYK-330, BYK-333, BYK-341, and BYK-344 (all manufactured by BYK Chemie). These surfactants have an ability to lower the surface tension, improve the wettability of a support and suppress repelling.

The content of the surfactant in the composition is appropriately selected according to the intended purpose and is generally preferably 0.0001 to 1 wt % relative to the weight of the entirety of the ink composition.

Other Component

In the present invention, the ink composition may comprise a component other than the above-mentioned components as necessary.

Examples of the other component include a sensitizer, a cosensitizer, another polymerizable compound, another polymerization initiator, a UV absorber, an antioxidant, an anti-fading agent, a conductive salt, a solvent, a polymer compound, and a basic compound.

Sensitizer

In the present invention, the ink composition may contain a sensitizer in order to promote decomposition of the above-mentioned polymerization initiator by absorbing specific actinic radiation. The sensitizer in the electronically excited state causes actions such as electron transfer, energy transfer, or heat generation upon contact with the polymerization initiator. This causes the polymerization initiator to undergo a chemical change and decompose, thus forming a radical, an acid, or a base.

As the sensitizer that can be use in the present invention, it is preferable to use a sensitizing dye. Preferred examples of the sensitizing dye include those that belong to compounds below and have an adsorption wavelength in the region of 350 nm to 450 nm.

Specific examples thereof include polynuclear aromatic compounds (e.g. pyrene, perylene, triphenylene), xanthenes (e.g. fluorescein, eosin, erythrosine, rhodamine B, rose bengal), cyanines (e.g. thiacarbocyanine, oxacarbocyanine), merocyanines (e.g. merocyanine, carbomerocyanine), thiazines (e.g. thionine, methylene blue, toluidine blue), acridines (e.g. acridine orange, chloroflavin, acriflavine), anthraquinones (e.g. anthraquinone), squaryliums (e.g. squarylium), and coumarins (e.g. 7-diethylamino-4-methylcoumarin).

Preferred examples of the sensitizing dye include compounds represented by Formulae (IX) to (XIII) below.

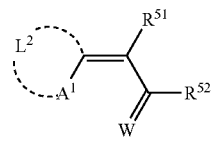

(IX)

In Formula (IX), $A^1$ denotes a sulfur atom or $NR^{50}$, $R^{50}$ denotes an alkyl group or an aryl group, $L^2$ denotes a non-metallic atomic group forming a basic nucleus of a dye in cooperation with a neighboring $A^1$ and the neighboring carbon atom, $R^{51}$ and $R^{52}$ independently denote a hydrogen atom or a monovalent non-metallic atomic group, and $R^{51}$ and $R^{52}$ may be bonded together to form an acidic nucleus of a dye. W denotes an oxygen atom or a sulfur atom.

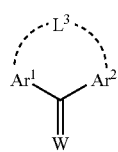
(X)

In Formula (X), $Ar^1$ and $Ar^2$ independently denote an aryl group and are connected to each other via a bond of -$L^3$-. Here, $L^3$ denotes —O— or —S—. W has the same meaning as that shown in Formula (IX).

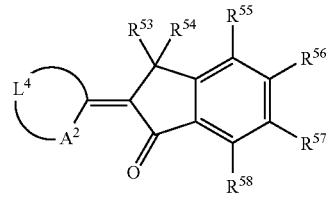
(XI)

In Formula (XI), $A_2$ denotes a sulfur atom or $NR^{59}$, $L^4$ denotes a non-metallic atomic group forming a basic nucleus of a dye in cooperation with the neighboring $A_2$ and carbon atom, $R^{53}$, $R^{54}$, $R^{55}$, $R^{56}$, $R^{57}$, and $R^{58}$ independently denote a monovalent non-metallic atomic group, and $R^{59}$ denotes an alkyl group or an aryl group.

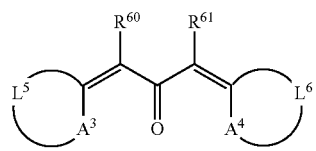
(XII)

In Formula (XII), $A^3$ and $A^4$ independently denote —S—, —$NR^{62}$—, or —$NR^{63}$—, $R^{62}$ and $R^{63}$ independently denote a substituted or unsubstituted alkyl group, or a substituted or unsubstituted aryl group, $L^5$ and $L^6$ independently denote a non-metallic atomic group forming a basic nucleus of a dye in cooperation with the neighboring $A^3$ and $A^4$ and neighboring carbon atom, and $R^{60}$ and $R^{61}$ independently denote a hydrogen atom or a monovalent non-metallic atomic group, or are bonded to each other to form an aliphatic or aromatic ring.

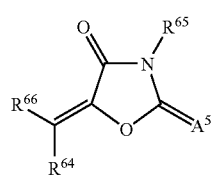
(XIII)

In Formula (XIII), $R^{66}$ denotes an aromatic ring or a hetero ring, which may have a substituent, and $A^5$ denotes an oxygen atom, a sulfur atom, or —$NR^{67}$—. $R^{64}$, $R^{65}$, and $R^{67}$ independently denote a hydrogen atom or a monovalent non-metallic atomic group, and $R^{67}$ and $R^{64}$, and $R^{65}$ and $R^{67}$ may be bonded to each other to form an aliphatic or aromatic ring.

Specific examples of the compounds represented by Formulae (IX) to (XIII) include (E-1) to (E-20) listed below.

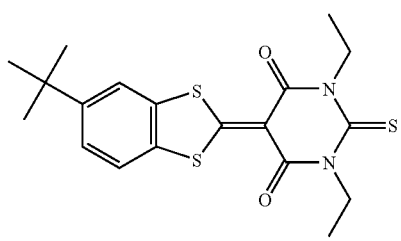
(E-1)

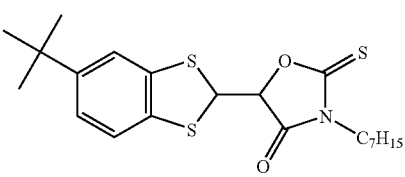
(E-2)

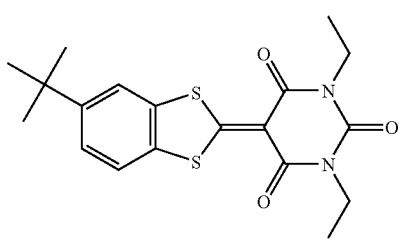
(E-3)

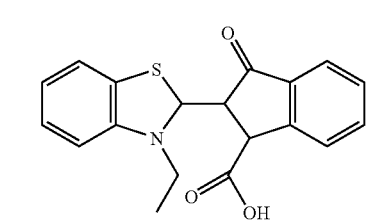
(E-4)

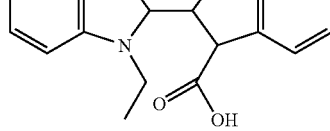

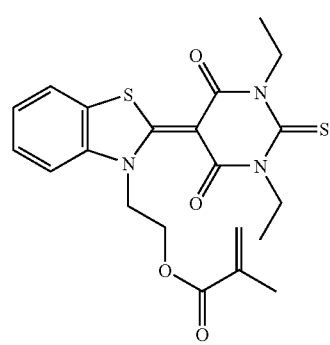
(E-5)

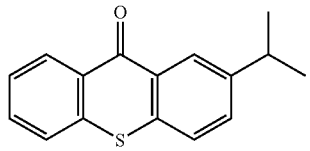
(E-6)

(E-7)

(E-8) 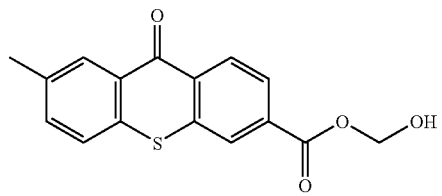

(E-9) 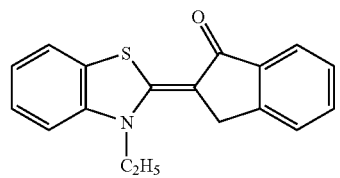

(E-10) 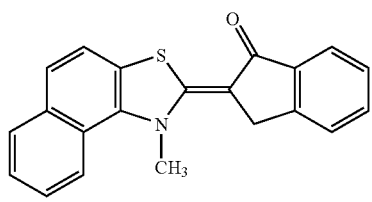

(E-11) 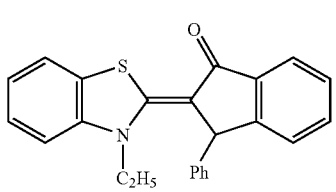

(E-12) 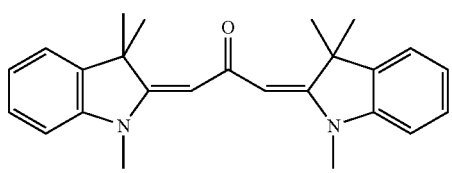

(E-13) 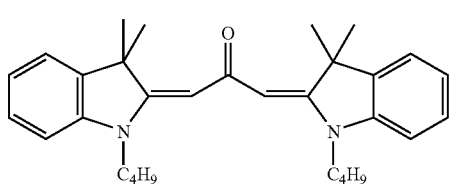

(E-14) 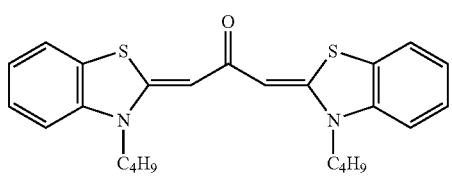

(E-15) 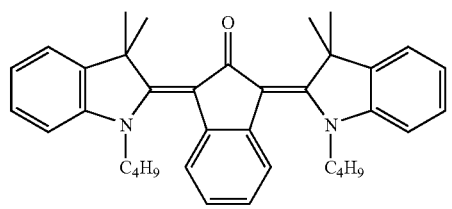

(E-16) 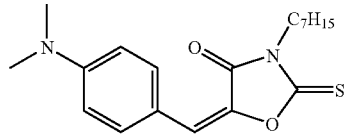

(E-17) 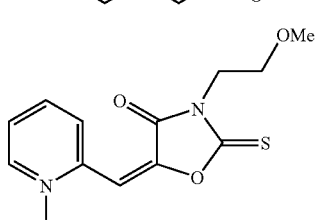

(E-18) 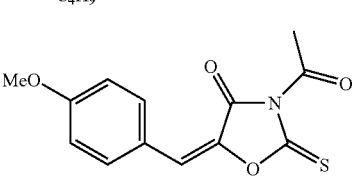

(E-19) 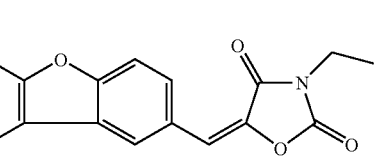

(E-20) 

In the present invention, the content of the sensitizing colorant in the ink composition is appropriately selected according to the intended purpose, but it is preferably 0.05 to 4 wt % relative to the weight of the entirety of the ink composition.

Cosensitizer

In the present invention, the ink composition preferably comprises a cosensitizer. In the present invention, the cosensitizer has the function of further improving the sensitivity of the sensitizing dye to actinic radiation or the function of suppressing inhibition by oxygen of polymerization of a polymerizable compound, etc.

Examples of such a cosensitizer include amines such as compounds described in M. R. Sander et al., 'Journal of Polymer Society', Vol. 10, p. 3173 (1972), JP-B-44-20189, JP-A-51-82102, JP-A-52-134692, JP-A-59-138205, JP-A-60-84305, JP-A-62-18537, JP-A-64-33104, and Research Disclosure No. 33825, and specific examples thereof include triethanolamine, ethyl p-dimethylaminobenzoate, p-formyldimethylaniline, and p-methylthiodimethylaniline.

Other examples of the cosensitizer include thiols and sulfides such as thiol compounds described in JP-A-53-702, JP-B-55-500806, and JP-A-5-142772, and disulfide compounds of JP-A-56-75643, and specific examples thereof include 2-mercaptobenzothiazole, 2-mercaptobenzoxazole, 2-mercaptobenzimidazole, 2-mercapto-4(3H)-quinazoline, and β-mercaptonaphthalene.

Yet other examples of the cosensitizer include amino acid compounds (e.g. N-phenylglycine, etc.), organometallic compounds described in JP-B-48-42965 (e.g. tributyltin acetate, etc.), hydrogen-donating compounds described in JP-B-55-34414, sulfur compounds described in JP-A-6-308727 (e.g. trithiane, etc.), phosphorus compounds described in JP-A-6-250387 (diethylphosphite, etc.), and Si—H, Ge—H compounds described in JP-A-8-54735.

In the present invention, the content of the cosensitizer in the ink composition is appropriately selected according to the intended purpose, but it is preferably 0.05 to 4 wt % relative to the weight of the entire ink composition.

UV Absorber

In the present invention, a UV absorber may be used from the viewpoint of improving the weather resistance of an image obtained and preventing discoloration.

The UV absorbers include benzotriazole compounds described in JP-A-58-185677, JP-A-61-190537, JP-A-2-782, JP-A-5-197075 and JP-A-9-34057; benzophenone compounds described in JP-A-46-2784, JP-A-5-194483 and U.S. Pat. No. 3,214,463; cinnamic acid compounds described in JP-B-48-30492, JP-B-56-21141 and JP-A-10-88106; triazine compounds described in JP-A-4-298503, JP-A-8-53427, JP-A-8-239368, JP-A-10-182621 and JP-W-8-501291 (the term "JP-W" as used herein means an unexamined published international patent application); compounds described in Research Disclosure No. 24239; and compounds represented by stilbene and benzoxazole compounds, which absorb ultraviolet rays to emit fluorescence, the so-called fluorescent brightening agents.

The amount thereof added is appropriately selected according to the intended application, and it is generally on the order of 0.5 to 15 wt % on the basis of the solids content in the composition.

Antioxidant

In order to improve the stability of the composition, an antioxidant may be added. Examples of the antioxidant include those described in Laid-open European Patent Nos. 223739, 309401, 309402, 310551, 310552, and 459416, Laid-open German Patent No. 3435443, JP-A-54-48535, JP-A-62-262047, JP-A-63-113536, JP-A-63-163351, JP-A-2-262654, JP-A-2-71262, JP-A-3-121449, JP-A-5-61166, JP-A-5-119449, and U.S. Pat. Nos. 4,814,262 and 4,980,275.

The amount thereof added is appropriately selected according to the intended application, and it is preferably on the order of 0.1 to 8 wt % on the basis of the solids content in the composition.

Antifading Agent

In the present invention, the ink composition may employ various organic and metal complex antifading agents. The organic antifading agents include hydroquinones, alkoxyphenols, dialkoxyphenols, phenols, anilines, amines, indanes, chromans, alkoxyanilines, and heterocycles, and the metal complex antifading agents include nickel complexes and zinc complexes. More specifically, there can be used compounds described in patents cited in Research Disclosure, No. 17643, Items VII-I to J, ibid., No. 15162, ibid., No. 18716, page 650, left-hand column, ibid., No. 36544, page 527, ibid., No. 307105, page 872, and ibid., No. 15162, and compounds contained in general formulae and compound examples of typical compounds described in JP-A-62-21572, pages 127 to 137.

The amount thereof added is appropriately selected according to the intended application, and it is preferably on the order of 0.1 to 8 wt % on the basis of the solids content in the composition.

Conductive Salt

In the present invention, the ink composition may contain, for the purpose of controlling discharge properties, a conductive salt such as potassium thiocyanate, lithium nitrate, ammonium thiocyanate, or dimethylamine hydrochloride.

Solvent

In the present invention, it is effective to add a trace amount of an organic solvent to the ink composition in order to improve adhesion to a recording medium (the same meaning as 'support').

In the present invention, the solvent used in the ink composition, when using a resin as an inner construction of polymerization particles, has preferably 2 or greater solubility parameter (SP value) than that of the resin and more preferably 3 or greater.

Examples of the solvent include ketone-based solvents such as acetone, methyl ethyl ketone, and diethyl ketone, alcohol-based solvents such as methanol, ethanol, 2-propanol, 1-propanol, 1-butanol, and tert-butanol, chlorine-based solvents such as chloroform and methylene chloride, aromatic-based solvents such as benzene and toluene, ester-based solvents such as ethyl acetate, butyl acetate, and isopropyl acetate, ether-based solvents such as diethyl ether, tetrahydrofuran, and dioxane, and glycol ether-based solvents such as ethylene glycol monomethyl ether and ethylene glycol dimethyl ether.

In this case, it is effective if the amount thereof added is in a range that does not cause problems with the solvent resistance or the VOC, and the amount is preferably in the range of 0.1 to 5 wt % relative to the total amount of the ink composition, and more preferably 0.1 to 3 wt %.

High Molecular Weight Compound

In the present invention, the ink composition may contain various types of high molecular weight compounds in order to adjust film physical properties. Examples of the high molecular weight compounds include acrylic polymers, polyvinylbutyral resins, polyurethane resins, polyamide resins, polyester resins, epoxy resins, phenol resins, polycarbonate resins, polyvinylbutyral resins, polyvinylformal resins, shellac, vinylic resins, acrylic resins, rubber-based resins, waxes, and other natural resins. They may be used in a combination of two or more types. Among these, a vinylic copolymer obtained by copolymerization of an acrylic monomer is preferable. Furthermore, as a copolymer component of the high molecular weight compound, a copolymer containing as a structural unit a 'carboxyl group-containing monomer', an 'alkyl methacrylate ester', or an 'alkyl acrylate ester' may preferably be used.

Basic Compound

It is preferable to add the basic compound from the viewpoint of improving the storage stability of the ink composition. As the basic compound that can be used in the present invention, a known basic compound may be used and, for example, a basic inorganic compound such as an inorganic salt or a basic organic compound such as an amine is preferably used.

In addition to the above, the composition may contain as necessary, for example, a leveling additive, a matting agent, a wax for adjusting film physical properties, or a tackifier in order to improve the adhesion to a recording medium such as polyolefin or PET, the tackifier not inhibiting polymerization.

Specific examples of the tackifier include high molecular weight tacky polymers described on pp. 5 and 6 of JP-A-2001-49200 (e.g. a copolymer formed from an ester of (meth) acrylic acid and an alcohol having an alkyl group with 1 to 20 carbons, an ester of (meth)acrylic acid and an alicyclic alcohol having 3 to 14 carbons, or an ester of (meth)acrylic acid and an aromatic alcohol having 6 to 14 carbons), and a low molecular weight tackifying resin having a polymerizable unsaturated bond.

Ink Physical Properties

In the present invention, from the viewpoint of dischargeability, it is preferable to use an ink composition having a viscosity measured at 25° C. using a type B viscometer (rotor rotational speed 20 rpm) of 25 mPa·s or less, preferably 15 to 30 mPa·s, and more preferably 15 to 23 mPa·s. Furthermore, the viscosity of the ink composition at the discharge temperature (preferably 25° C. to 80° C., and more preferably 25° C. to 50° C.) is preferably 3 to 15 mPa·s, and more preferably 3 to 13 mPa·s. In the above-mentioned range it is possible to realize high discharge stability.

When the viscosity at room temperature is set to be high, even when a porous support (recording medium) is used, penetration of the ink composition into the recording medium can be prevented, and uncured monomer can be reduced. Furthermore, composition spreading when composition droplets have landed can be suppressed, and as a result there is the advantage that the image quality is improved.

In the present invention, the surface tension of the ink composition at 25° C. are preferably 20 to 35 mN/m, and yet more preferably 23 to 33 mN/m. When recording is carried out on various types of support (recording medium) such as PET and polycarbonate, from the viewpoint of spread and penetration, it is preferably at least 20 mN/m, and from the viewpoint of wettability it is preferably not more than 35 mN/m.

In the present invention, the process for producing a molded printed material comprises a step of forming an image by discharging an ink composition on a support by an inkjet method.

Support

A support that can be used in the present invention is not particularly limited, and a known recording medium suitable for molding may be used.

Examples of the support include polyolefin-based resins such as polyethylene, polypropylene, polymethylpentene, polybutene, and an olefin-based thermoplastic elastomer, polyester resins such as polyethylene terephthalate, polybutylene terephthalate, polyethylene naphthalate, a terephthalic acid-isophthalic acid-ethylene glycol copolymer, a terephthalic acid-ethylene glycol-1,4-cyclohexanedimethanol copolymer, and a polyester-based thermoplastic elastomer, polyamide resins such as nylon-6, nylon-9, and nylon-66, fluorine-based resins such as polyvinyl fluoride, polyvinylidene fluoride, polyvinylidene trifluoride, an ethylene-ethylene tetrafluoride copolymer, and polyethylene tetrafluoride, an acrylic-based resin, polyvinyl chloride, polystyrene, and a polycarbonate resin.

With regard to the acrylic-based resin, for example, a resin such as polymethyl (meth)acrylate, polyethyl (meth)acrylate, polybutyl (meth)acrylate, a methyl (meth)acrylate-butyl (meth)acrylate copolymer, an ethyl (meth)acrylate-butyl (meth)acrylate copolymer, or a methyl (meth)acrylate-styrene copolymer (the term (meth)acrylate means acrylate or methacrylate) may be used singly or in a combination of two or more types.

In particular, from the viewpoint of molding being easy and various resistance properties of a finished molded printed material being excellent, it is preferable to use polyethylene terephthalate, a polycarbonate resin, or a resin formed by blending a polycarbonate resin with another resin.

The thickness of a thermoplastic resin sheet used as the support in the present invention (the total thickness in the case of a laminate structure) is not particularly limited as long as it is a resin sheet having a thickness in a range that allows vacuum and pressure forming employing the principles of embossing, vacuum forming, pressure forming, and vacuum/pressure forming to be carried out, and it is preferably 50 to 1000 μm, more preferably 70 to 800 μm, and yet more preferably 100 to 500 μm.

It is appropriately selected from thermoplastic resin sheets while taking into consideration suitability for embossing in terms of giving a high gloss region, a low gloss region, and a variation in sheet thickness and, moreover, a balance between molding suitability and embossing durability (preventing disappearance of embossing) due to heat during molding when a printed material is thermally softened and molded by vacuum forming, etc. The layer structure of a transparent resin substrate sheet may be a single layer or a laminate in which two or more layers of different types of resin are laminated.

It is possible to add an appropriate additive to the thermoplastic resin sheets as necessary. As the additive, various types of additive may be added in an appropriate amount such that they do not impair surface gloss or thermal behavior such as melting point. Examples thereof include a photostabilizer such as a benzotriazole-based, benzophenone-based, etc. UV absorber or a hindered amine-based radical scavenger, a lubricant such as a silicone resin or a wax, a colorant, a plasticizer, a heat stabilizer, an antimicrobial agent, an antimold agent, and an antistatic agent.

The molded printed material of the present invention may be produced by subjecting the thermoplastic resin sheet to vacuum forming, etc., and an image is formed on the support by the inkjet method prior to molding. An image is generally formed on the reverse side of a transparent sheet (side facing the mold in vacuum forming), but an image may also be formed on the opposite side. It is also possible to form an image only on said opposite side depending on the circumstances, and in this case the thermoplastic resin sheet used as a substrate is not necessarily transparent.

Production of Printed Material by Inkjet Method

The process for producing a molded printed material of the present invention comprises a step of forming an image by discharging the ink composition on a support by the inkjet method and a step of curing the radically polymerizable ink composition by irradiating with actinic radiation the image obtained so as to obtain a printed material having the image cured on the support. The inkjet method is a method in which very small ink droplets are discharged with good reproducibility and land in a desired location.

In order to form an image using the inkjet method, the inkjet recording system described below may suitably be used.

Inkjet Recording Method and Inkjet Recording System

In the present invention, the step of forming an image by discharging the ink composition on a support by the inkjet method may employ an inkjet recording system that is described in detail below. The inkjet recording system that can be used in the present invention is not particularly limited, and a known inkjet recording system that can achieve a target resolution may be selected freely and used. That is, any known inkjet recording system, including a commercial product, may carry out discharge of the ink composition onto the support.

Examples of the inkjet recording system that can be used in the present invention include a system comprising an ink supply system, a temperature sensor, and an actinic radiation source.

The ink supply system comprises a main tank containing the ink composition, a supply pipe, an ink supply tank immediately before an inkjet head, a filter, and a piezo system inkjet head. The piezo system inkjet head is driven so as to discharge multisize dots of 1 to 100 pL, and preferably 8 to 30 pL, at a resolution of 320×320 to 4000×4000 dpi, more preferably 400×400 to 1600×1600 dpi, and yet more preferably 720×720 dpi. Here, the dpi referred to in the present invention denotes the number of dots per 2.54 cm.

Since it is desirable for the radiation curing type ink to be discharged at a constant temperature, a section from the supply tank to the inkjet head is thermally insulated and heated. A method of controlling temperature is not particularly limited, but it is preferable to provide, for example, temperature sensors at a plurality of pipe section positions, and control heating according to the ink flow rate and the temperature of the surroundings. The temperature sensors may be provided on the supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

The radiation curing type of the ink composition generally has a viscosity that is higher than that of a normal ink composition or a water-based ink used for an inkjet recording ink, and variation in viscosity due to a change in temperature at the time of discharge is large. Viscosity variation in the ink has a large effect on changes in liquid droplet size and changes in liquid droplet discharge speed and, consequently, causes the image quality to be degraded. It is therefore necessary to maintain the discharge temperature as constant as possible. In the present invention, the control range for the temperature is desirably preferably ±5° C. of a set temperature, more preferably ±2° C. of the set temperature, and yet more preferably ±1° C. of the set temperature.

A step of curing the radically polymerizable ink composition by irradiating with actinic radiation the image obtained so as to obtain a printed material having the image cured on the support is now explained.

The ink composition discharged on a support may be cured by irradiation with actinic radiation. In this process, a polymerization initiator contained in the ink composition is decomposed by irradiation with actinic radiation so as to generate an initiating species such as a radical, an acid, or a base, and the initiating species functions so as to cause and promote a polymerization reaction of a radically polymerizable compound. When a sensitizer is present together with the polymerization initiator in the ink composition, the sensitizer in the system absorbs actinic radiation and becomes excited, and promotes decomposition of the polymerization initiator upon contact with the polymerization initiator, thus achieving a curing reaction with higher sensitivity.

The actinic radiation used in this process may include α rays, γ rays, an electron beam, X rays, UV rays, visible light, and IR rays. Although it depends on the absorption characteristics of the sensitizing dye, the peak wavelength of the actinic radiation is, for example, 200 to 600 nm, preferably 300 to 450 nm, and more preferably 350 to 420 nm.

Furthermore, in the present invention, the polymerization initiation system has sufficient sensitivity for low output actinic radiation. The actinic radiation is applied therefore so that the illumination intensity on the exposed surface is, for example, 10 to 4,000 mW/cm$^2$, and preferably 20 to 2,500 mW/cm$^2$.

As an actinic radiation source, a mercury lamp, a gas/solid laser, etc. are mainly used, and for UV photocuring inkjet a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, U.S. Pat. No. 6,084,250 discloses an LED that can emit actinic radiation whose wavelength is centered between 300 nm and 370 nm. Furthermore, another violet LED is available, and irradiation can be carried out with radiation of a different UV bandwidth. The actinic radiation source particularly preferable in the present invention is a UV-LED, and a UV-LED having a peak wavelength at 350 to 420 nm is particularly preferable.

The maximum illumination intensity of the LED on a recording medium is preferably 10 to 2,000 mW/cm$^2$, more preferably 20 to 1,000 mW/cm$^2$, and particularly preferably 50 to 800 mJ/cm$^2$.

In the present invention, the ink composition is desirably exposed to such actinic radiation for preferably 0.01 to 120 sec., and more preferably 0.1 to 90 sec.

Irradiation conditions and a basic method for irradiation with actinic radiation are disclosed in JP-A-60-132767. Specifically, a light source is provided on either side of a head unit that includes a composition discharge device, and the head unit and the light source are made to scan by a so-called shuttle system. Irradiation with actinic radiation is carried out after a certain time (preferably 0.01 to 0.5 sec., more preferably 0.01 to 0.3 sec., and yet more preferably 0.01 to 0.15 sec.) has elapsed from when the droplets have landed. By controlling the time from droplets landing to irradiation so as to be a minimum in this way, it becomes possible to prevent the droplets that have landed on a support from spreading before being cured. Furthermore, since the droplets can be exposed before it reaches a deep area of a porous support that the light source cannot reach, it is possible to prevent monomer from remaining unreacted.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light.

By employing such a method, it is possible to maintain a uniform dot diameter for landed ink even for various types of support having different surface wettability, thereby improving the image quality. In order to obtain a color image, it is preferable to superimpose colors in order from those with a low lightness. By superimposing inks in order from one with low lightness, it is easy for radiation to reach a lower ink, the curing sensitivity is good, the amount of residual monomer decreases, and an improvement in adhesion can be expected. Furthermore, although it is possible to discharge all colors and then expose them at the same time, it is preferable to expose one color at a time from the viewpoint of promoting curing.

Molding of Printed Material

The process of present invention comprises a step of molding the printed material. As molding suitably employed in the present invention, embossing, vacuum forming, pressure forming, or vacuum/pressure forming may be employed.

As a system for molding a printed material, a known system may be used, and the system may be integral with the inkjet recording system or separate therefrom.

Embossing

Embossing is a process in which a three-dimensional feel is given by indenting a printed material, etc. in a desired shape such as a pattern or a letter, and may be carried out using a roller, a press, etc.

Examples of embossing include a hot/cold pressing method, and a method described in JP-A-10-199360, etc. may be referred to.

One example of an embossing system employing the hot/cold pressing method is shown below.

In the embossing system, a lower platen and an upper platen are disposed so that they can move toward and away from each other. A plate-shaped heater is fixed on top of the lower platen, and a plate-shaped heater is also fixed to a lower face of the upper platen. This enables a support to be hot pressed while it is heated. In this hot pressing machine, the plate-shaped heater on the lower platen is equipped with a mold having a projection following a predetermined embossing shape, and a mold having a recess that conforms to the shape of the projection is mounted so as to be in contact with the heater fixed to the lower face of the upper platen. A support having an image formed thereon is positioned, a cushion sheet is placed between the support and the mold with the recess, and the support and the cushion sheet are pressed between the upper platen and the lower platen by lowering the upper platen, etc. A pressure applied in this hot pressing step is, for example, 30 tons, and the heating temperature from the plate-shaped heater is, for example, 170° C. The upper platen is pressed against the lower platen, the support and the cushion sheet are sandwiched between the molds, and this hot pressing is maintained for about 3 minutes. The support is heated by the heaters via the molds, and a plurality of projections are formed due to thermal deformation. Subsequently, the support and the cushion sheet sandwiched between the molds are subjected to cold pressing by placing them between internally water-cooled platens without heaters and applying a pressure of, for example, 30 tones by pressing the platens for about 3 minutes. This enables an embossed molded printed material to be obtained in which the support has a projecting shape due to thermal deformation by the hot pressing. The pressure applied and the heating temperature may be adjusted appropriately according to the material of the printed material and conditions such as the shape that is to be formed, etc.

Vacuum Forming Pressure Forming, and Vacuum/Pressure Forming

Vacuum forming is a method in which a support having an image formed thereon is preheated to a temperature at which it can be thermally deformed, and molding is carried out by pressing it against a mold and cooling while sucking it toward the mold by means of vacuum and stretching it; pressure forming is a method in which a support having an image formed thereon is preheated to a temperature at which it can be thermally deformed, and molding is carried out by pressing it against a mold by applying pressure from the side opposite to the mold and cooling. Vacuum/pressure forming is a method in which molding is carried out by applying a vacuum and pressure at the same time.

In detail, the 'Thermal Molding' section described on p. 766 to 768 of 'Kobunshi Daijiten' (Polymer Dictionary) (Maruzen) and publications cited in the section may be referred to.

In accordance with the present invention, there can be provided a process for producing a molded printed material in which cracks and pinholes are not generated when carrying out molding such as embossing, vacuum forming, pressure forming, or vacuum/pressure forming, and a molded printed material obtained by the above production process.

EXAMPLES

The present invention is explained in further detail by reference to Examples and Comparative Examples. However, the present invention should not be construed as being limited to these Examples.

'Parts' described below means 'parts by weight' unless otherwise specified.

Materials used in the present invention were as described below.

Colorant (the Same Meaning as 'Coloring Material')
IRGALITE BLUE GLVO (cyan pigment, manufactured by Ciba Specialty Chemicals) CINQUASIA Magenta RT-335-D (magenta pigment, manufactured by Ciba Specialty Chemicals)
NOVOPERM YELLOW H2G (yellow pigment, manufactured by Clariant)
SPECIAL BLACK 250 (black pigment, manufactured by Ciba Specialty Chemicals)
Tipaque CR-60-2 (white pigment, manufactured by Ishihara Sangyo Kaisha Ltd.)
Monofunctional Radically Polymerizable Monomers Having a Cyclic Structure and Only One Ethylenically Unsaturated Double Bond Group Selected from the Group Consisting of an Acrylate Group, a Methacrylate Group, an Acrylamide Group, a Methacrylamide Group, and an N-Vinyl Group, Hereinafter also Described as 'Cyclic Monofunctional Monomers'
Fancryl FA-512A (corresponding to compound example M-10, manufactured by Hitachi Chemical Co., Ltd.)
Fancryl FA-513M (corresponding to compound example M-18, manufactured by Hitachi Chemical Co., Ltd.)
2-Naphthyl acrylate
SR506 (isobornyl acrylate, manufactured by Sartomer Company Inc.)
NK ester AMP-10G (phenoxyethyl acrylate, manufactured by Shin-Nakamura Chemical Co., Ltd.)
Tetrahydrofurfuryl acrylate (manufactured by Aldrich)
N-Cyclohexylacrylamide (manufactured by DSM)
N-Vinylcaprolactam (NVC, manufactured by ISP)
Other Radically Polymerizable Monomers
SR489D (acyclic monofunctional monomer: tridecyl acrylate, manufactured by Sartomer Company Inc.)
Actilane 421 (difunctional monomer: propoxylated neopentyl glycol diacrylate, manufactured by Akcros)
Rapi-Cure DVE-3 (triethylene glycol divinyl ether, manufactured by ISP)
Polymeric Dispersants
Solsperse 32000 (dispersant, manufactured by Noveon)
Solsperse 36000 (dispersant, manufactured by Noveon)
Radical Polymerization Initiators
Lucirin TPO (2,4,6-trimethylbenzoyldiphenylphosphine oxide, manufactured by BASF)
Benzophenone (manufactured by Wako Pure Chemical Industries, Ltd.)
IRGACURE 184 (1-hydroxycyclohexyl phenyl ketone, manufactured by Ciba Specialty Chemicals)
FIRSTCURE ITX (manufactured by ChemFirst)

Other Additives
BYK-307 (surfactant, manufactured by BYK Chemie)
FIRSTCURE ST-1 (polymerization inhibitor, manufactured by ChemFirst)

Synthesis of Compound Example M-29

Compound example M-29 (2-naphthyl acrylate) was obtained by a reaction of 2-naphthyl alcohol and acryloyl chloride.

Preparation of Cyan Mill Base A 300 parts by weight of IRGALITE BLUE GLVO, 600 parts by weight of Actilane 421, and 100 parts by weight of Solsperse 32000 were mixed by stirring to give a pigment mill base. Preparation of the pigment mill base was carried out by putting it into an M50 disperser motor mill (manufactured by Eiger) and dispersing using zirconia beads having a diameter of 0.65 mm at a peripheral speed of 9 m/s for 4 hours.

Preparation of Magenta Mill Base B 300 parts by weight of CINQUASIA MAGENTA RT-335 D, 600 parts by weight of Actilane 421, and 100 parts by weight of Solsperse 32000 were mixed by stirring to give a pigment mill base. Preparation of the pigment mill base was carried out by putting it into an M50 disperser motor mill (manufactured by Eiger) and dispersing using zirconia beads having a diameter of 0.65 mm at a peripheral speed of 9 m/s for 10 hours.

Preparation of Yellow Mill Base C 300 parts by weight of NOVOPERM YELLOW H2G, 600 parts by weight of Actilane 421, and 100 parts by weight of Solsperse 32000 were mixed by stirring to give a pigment mill base. Preparation of the pigment mill base was carried out by putting it into an M50 disperser motor mill (manufactured by Eiger) and dispersing using zirconia beads having a diameter of 0.65 mm at a peripheral speed of 9 m/s for 10 hours.

Preparation of Black Mill Base D 300 parts by weight of SPECIAL BLACK 250, 600 parts by weight of Actilane 421, and 100 parts by weight of Solsperse 32000 were mixed by stirring to give a pigment mill base. Preparation of the pigment mill base was carried out by putting it into an M50 disperser motor mill (manufactured by Eiger) and dispersing using zirconia beads having a diameter of 0.65 mm at a peripheral speed of 9 m/s for 7 hours.

Preparation of White Mill Base E 500 parts by weight of Tipaque CR60-2, 450 parts by weight of NK ester AMP-10G, and 50 parts by weight of Solsperse 36000 were mixed by stirring to give a pigment mill base. Preparation of the pigment mill base was carried out by putting it into an M50 disperser motor mill (manufactured by Eiger) and dispersing using zirconia beads having a diameter of 0.65 mm at a peripheral speed of 9 m/s for 4 hours.

Inkjet Image Recording Method

Subsequently, recording was carried out on a recording medium using an experimental inkjet recording system having a piezo system inkjet nozzle. The ink supply system comprised a main tank, a supply pipe, an ink supply tank immediately before an inkjet head, a filter, and a piezo system inkjet head, and a section from the ink supply tank to the inkjet head was thermally insulated and heated. Temperature sensors were provided on the ink supply tank and in the vicinity of the nozzle of the inkjet head, and the temperature was controlled so that the nozzle section was always at 45° C.±2° C. The piezo system inkjet head was driven so as to discharge multisize dots of 8 to 30 pL at a resolution of 720×720 dpi. The exposure system, the main scanning speed, and the discharge frequency were adjusted so that, after landing, UV light was focused to give an exposure area illumination intensity of 2,100 mW/cm$^2$, and irradiation started 0.1 sec. after the ink landed on the recording medium. The cumulative amount of light applied to an image was adjusted so as to be 6,000 mJ/cm$^2$. The UV lamp employed an HAN250NL high-cure mercury lamp (manufactured by GS Yuasa Corporation). Here, the dpi referred to in the present invention denotes the number of dots per 2.54 cm. As a recording medium, HK31-WF (film thickness 188 µm, PET, manufactured by Higashiyama Film Corporation) was used for the embossing test below, and Teflex FT-3 (film thickness 50 µm, PET, manufactured by Teijin DuPont Films Japan Ltd.) was used for a vacuum forming process test. Printing was carried out so that each sample had an average film thickness of 12 µm for the cured ink coating.

Forming Process Evaluation Method

Embossing Test

Figure 2:
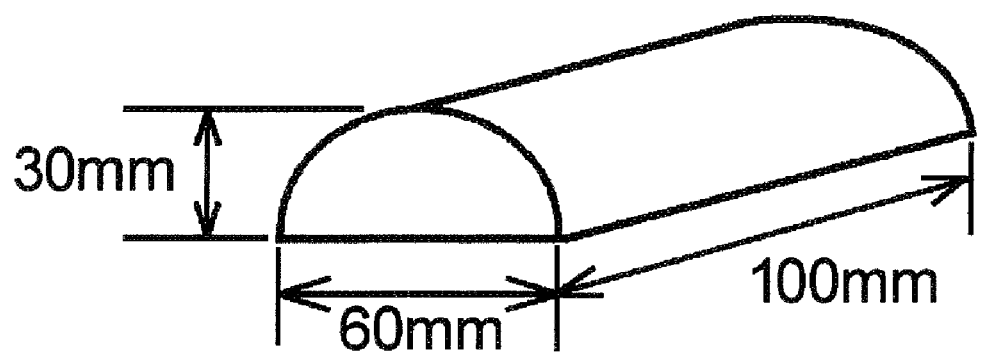

Under conditions of 25° C., a printed material thus formed was sandwiched between stainless steel projecting and recessed molds shown in FIG. 1, and a load of 250 kg was applied thereto for 5 sec using a MIZUHO model A hand power press (manufactured by Matsushita Dendo Kogu K.K.), thus carrying out embossing. The embossed area on the image was visually examined for the occurrence of cracks or pinholes. Evaluated as good when there were no cracks or pinholes.

Vacuum Forming Test

Vacuum forming was carried out using a Forming 300X vacuum forming system (manufactured by Seiko Sangyo Co., Ltd.). A wooden mold shown in FIG. 2 was placed at the center of a vacuum table of the vacuum forming system, and the temperature of a heater was set so that the temperature of a support became 90° C. After the support temperature reached 90° C., the vacuum table on which the wooden mold was placed was gradually raised by operating a table raise/lower lever, thus carrying out vacuum forming. The molded printed material was visually examined for the occurrence of cracks or pinholes.

Viscosity Measurement Method

Measurement of viscosity in the Examples was carried out using a Brookfield LVDV-I type B viscometer (manufactured by Brookfield) at 25° C. with a rotor rotational speed of 20 rpm.

Example 1

The components below were stirred using a high-speed water-cooled stirrer to give a cyan UV inkjet ink. The viscosity was 18 mPa·s.

Cyan Ink Composition

| | |
|---|---|
| Cyan mill base A (coloring material, polymerizable monomer, polymeric dispersant) | 6.0 parts |
| N-Vinylcaprolactam (cyclic monofunctional monomer) | 25.0 parts |
| Fancryl FA-512A (cyclic monofunctional monomer) | 35.4 parts |
| NK ester AMP-10G (cyclic monofunctional monomer) | 20.0 parts |
| FIRSTCURE ST-1 (polymerization inhibitor) | 0.05 parts |
| Lucirin TPO (radical polymerization initiator) | 8.5 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 1.

Example 2

The components below were stirred using a high-speed water-cooled stirrer to give a magenta UV inkjet ink. The viscosity was 18 mPa·s.

Magenta Ink Composition

| | |
|---|---|
| Magenta mill base B (coloring material, polymerizable monomer, polymeric dispersant) | 12.0 parts |
| N-Vinylcaprolactam (cyclic monofunctional monomer) | 25.0 parts |
| Fancryl FA-512A (cyclic monofunctional monomer) | 29.4 parts |
| NK ester AMP-10G (cyclic monofunctional monomer) | 20.0 parts |
| FIRSTCURE ST-1 (polymerization inhibitor) | 0.05 parts |
| Lucirin TPO (radical polymerization initiator) | 8.5 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 1.

Example 3

The components below were stirred using a high-speed water-cooled stirrer to give a yellow UV inkjet ink. The viscosity was 18 mPa·s.

Yellow Ink Composition

| | |
|---|---|
| Yellow mill base C (coloring material, polymerizable monomer, polymeric dispersant) | 12.0 parts |
| N-Vinylcaprolactam (cyclic monofunctional monomer) | 25.0 parts |
| Fancryl FA-512A (cyclic monofunctional monomer) | 29.4 parts |
| NK ester AMP-10G (cyclic monofunctional monomer) | 20.0 parts |
| FIRSTCURE ST-1 (polymerization inhibitor) | 0.05 parts |
| Lucirin TPO (radical polymerization initiator) | 8.5 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 1.

Example 4

The components below were stirred using a high-speed water-cooled stirrer to give a black UV inkjet ink. The viscosity was 22 mPa·s.

Black Ink Composition

| | |
|---|---|
| Black mill base D (coloring material, polymerizable monomer, polymeric dispersant) | 6.0 parts |
| N-Vinylcaprolactam (cyclic monofunctional monomer) | 30.0 parts |
| Fancryl FA-512A (cyclic monofunctional monomer) | 50.4 parts |
| FIRSTCURE ST-1 (polymerization inhibitor) | 0.05 parts |
| Lucirin TPO (radical polymerization initiator) | 8.5 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 1.

Example 5

The components below were stirred using a high-speed water-cooled stirrer to give a white UV inkjet ink. The viscosity was 24 mPa·s.

White Ink Composition

| | |
|---|---|
| White mill base E (coloring material, cyclic monofunctional monomer, polymeric dispersant) | 31.0 parts |
| N-Vinylcaprolactam (cyclic monofunctional monomer) | 18.0 parts |
| Fancryl FA-512A (cyclic monofunctional monomer) | 26.4 parts |
| NK ester AMP-10G (cyclic monofunctional monomer) | 10.0 parts |
| FIRSTCURE ST-1 (polymerization inhibitor) | 0.05 parts |
| Lucirin TPO (radical polymerization initiator) | 8.5 parts |
| Benzophenone (radical polymerization initiator) | 3.0 parts |
| IRGACURE 184 (radical polymerization initiator) | 2.0 parts |
| FIRSTCURE ITX (radical polymerization initiator) | 1.0 parts |
| BYK-307 (surfactant) | 0.05 parts |

Inkjet recording was carried out using the ink composition thus obtained. The embossing test and the vacuum forming test were carried out using the image thus obtained. The results are given in Table 1.

Example 6

The components below were stirred using a high-speed water-cooled stirrer to give a cyan UV inkjet ink. The viscosity was 23 mPa·s.

Cyan Ink Composition

| | |
|---|---|
| Cyan mill base A (coloring material, polymerizable monomer, polymeric dispersant) | 6.0 parts |
| N-Vinylcaprolactam (cyclic monofunctional monomer) | 32.0 parts |
| Fancryl FA-512A (cyclic monofunctional monomer) | 30.4 parts |
| Fancryl FA-513M (cyclic monofunctional monomer) | 18.0 parts |
| FIRSTCURE ST-1 (polymerization inhibitor) | 0.05 parts |
| Lucirin TPO (radical polymerization initiator) | 8.5 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 1.

Example 7

The components below were stirred using a high-speed water-cooled stirrer to give a cyan UV inkjet ink. The viscosity was 24 mPa·s.

Cyan Ink Composition

| | |
|---|---|
| Cyan mill base A (coloring material, polymerizable monomer, polymeric dispersant) | 6.0 parts |
| N-Vinylcaprolactam (cyclic monofunctional monomer) | 34.0 parts |
| NK ester AMP-10G (cyclic monofunctional monomer) | 30.4 parts |
| N-Cyclohexylacrylamide (cyclic monofunctional monomer) | 16.0 parts |
| FIRSTCURE ST-1 (polymerization inhibitor) | 0.05 parts |
| Lucirin TPO (radical polymerization initiator) | 8.5 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 1.

Example 8

The components below were stirred using a high-speed water-cooled stirrer to give a cyan UV inkjet ink. The viscosity was 19 mPa·s.

Cyan Ink Composition

| | |
|---|---|
| Cyan mill base A (coloring material, polymerizable monomer, polymeric dispersant) | 6.0 parts |
| N-Vinylcaprolactam (cyclic monofunctional monomer) | 30.0 parts |
| NK ester AMP-10G (cyclic monofunctional monomer) | 25.4 parts |
| 2-Naphthyl acrylate (cyclic monofunctional monomer) | 25.0 parts |
| FIRSTCURE ST-1 (polymerization inhibitor) | 0.05 parts |
| Lucirin TPO (radical polymerization initiator) | 8.5 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 1.

Example 9

The components below were stirred using a high-speed water-cooled stirrer to give a cyan UV inkjet ink. The viscosity was 16 mPa·s.

Cyan Ink Composition

| | |
|---|---|
| Cyan mill base A (coloring material, polymerizable monomer, polymeric dispersant) | 6.0 parts |
| N-Vinylcaprolactam (cyclic monofunctional monomer) | 30.0 parts |
| NK ester AMP-10G (cyclic monofunctional monomer) | 25.4 parts |
| SR506 (cyclic monofunctional monomer) | 25.0 parts |
| FIRSTCURE ST-1 (polymerization inhibitor) | 0.05 parts |
| Lucirin TPO (radical polymerization initiator) | 8.5 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 1.

Example 10

The components below were stirred using a high-speed water-cooled stirrer to give a cyan UV inkjet ink. The viscosity was 15 mPa·s.

Cyan Ink Composition

| | |
|---|---|
| Cyan mill base A (coloring material, polymerizable monomer, polymeric dispersant) | 6.0 parts |
| N-Vinylcaprolactam (cyclic monofunctional monomer) | 30.0 parts |
| Tetrahydrofurfuryl acrylate (cyclic monofunctional monomer) | 50.4 parts |
| FIRSTCURE ST-1 (polymerization inhibitor) | 0.05 parts |
| Lucirin TPO (radical polymerization initiator) | 8.5 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 1.

Example 11

The components below were stirred using a high-speed water-cooled stirrer to give a cyan UV inkjet ink. The viscosity was 18 mPa·s.

Cyan Ink Composition

| | |
|---|---|
| Cyan mill base A (coloring material, polymerizable monomer, polymeric dispersant) | 6.0 parts |
| N-Vinylcaprolactam (cyclic monofunctional monomer) | 12.0 parts |
| Fancryl FA-512A (cyclic monofunctional monomer) | 35.4 parts |
| NK ester AMP-10G (cyclic monofunctional monomer) | 33.0 parts |
| FIRSTCURE ST-1 (polymerization inhibitor) | 0.05 parts |
| Lucirin TPO (radical polymerization initiator) | 8.5 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 1.

Example 12

The components below were stirred using a high-speed water-cooled stirrer to give a cyan UV inkjet ink. The viscosity was 23 mPa·s.

Cyan Ink Composition

| | |
|---|---|
| Cyan mill base A (coloring material, polymerizable monomer, polymeric dispersant) | 6.0 parts |
| Fancryl FA-512A (cyclic monofunctional monomer) | 65.4 parts |
| NK ester AMP-10G (cyclic monofunctional monomer) | 15.0 parts |
| FIRSTCURE ST-1 (polymerization inhibitor) | 0.05 parts |
| Lucirin TPO (radical polymerization initiator) | 8.5 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 1.

Example 13

The components below were stirred using a high-speed water-cooled stirrer to give a magenta UV inkjet ink. The viscosity was 23 mPa·s.

Magenta Ink Composition

| | |
|---|---|
| Magenta mill base B (coloring material, polymerizable monomer, polymeric dispersant) | 14.0 parts |
| N-Vinylcaprolactam (cyclic monofunctional monomer) | 25.0 parts |
| Fancryl FA-512A (cyclic monofunctional monomer) | 47.0 parts |
| FIRSTCURE ST-1 (polymerization inhibitor) | 0.05 parts |
| Lucirin TPO (radical polymerization initiator) | 8.9 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 2.

Example 14

The components below were stirred using a high-speed water-cooled stirrer to give a magenta UV inkjet ink. The viscosity was 23 mPa·s.
Magenta Ink Composition

| | |
|---|---|
| Magenta mill base B (coloring material, polymerizable monomer, polymeric dispersant) | 14.0 parts |
| N-Vinylcaprolactam (cyclic monofunctional monomer) | 25.0 parts |
| Fancryl FA-512A (cyclic monofunctional monomer) | 44.0 parts |
| Actilane 421 (bifunctional monomer) | 3.0 parts |
| FIRSTCURE ST-1 (polymerization inhibitor) | 0.05 parts |
| Lucirin TPO (radical polymerization initiator) | 8.9 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 2.

Example 15

The components below were stirred using a high-speed water-cooled stirrer to give a magenta UV inkjet ink. The viscosity was 23 mPa·s.
Magenta Ink Composition

| | |
|---|---|
| Magenta mill base B (coloring material, polymerizable monomer, polymeric dispersant) | 14.0 parts |
| N-Vinylcaprolactam (cyclic monofunctional monomer) | 25.0 parts |
| Fancryl FA-512A (cyclic monofunctional monomer) | 41.0 parts |
| Actilane 421 (bifunctional monomer) | 6.0 parts |
| FIRSTCURE ST-1 (polymerization inhibitor) | 0.05 parts |
| Lucirin TPO (radical polymerization initiator) | 8.9 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 2.

Example 16

The components below were stirred using a high-speed water-cooled stirrer to give a cyan UV inkjet ink. The viscosity was 20 mPa·s.
Cyan Ink Composition

| | |
|---|---|
| Cyan mill base A (coloring material, polymerizable monomer, polymeric dispersant) | 6.0 parts |
| N-Vinylcaprolactam (cyclic monofunctional monomer) | 25.0 parts |
| Fancryl FA-512A (cyclic monofunctional monomer) | 55.4 parts |
| FIRSTCURE ST-1 (polymerization inhibitor) | 0.05 parts |
| Lucirin TPO (radical polymerization initiator) | 8.5 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 3.

Example 17

The components below were stirred using a high-speed water-cooled stirrer to give a cyan UV inkjet ink. The viscosity was 18 mPa·s.
Cyan Ink Composition

| | |
|---|---|
| Cyan mill base A (coloring material, polymerizable monomer, polymeric dispersant) | 6.0 parts |
| N-Vinylcaprolactam (cyclic monofunctional monomer) | 25.0 parts |
| SR489D (acyclic monofunctional monomer) | 15.0 parts |
| Fancryl FA-512A (cyclic monofunctional monomer) | 40.4 parts |
| FIRSTCURE ST-1 (polymerization inhibitor) | 0.05 parts |
| Lucirin TPO (radical polymerization initiator) | 8.5 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 3.

Comparative Example 1

The components below were stirred using a high-speed water-cooled stirrer to give a magenta UV inkjet ink. The viscosity was 24 mPa·s.
Magenta Ink Composition

| | |
|---|---|
| Magenta mill base B (coloring material, polymerizable monomer, polymeric dispersant) | 14.0 parts |
| N-Vinylcaprolactam (cyclic monofunctional monomer) | 25.0 parts |
| Fancryl FA-512A (cyclic monofunctional monomer) | 34.0 parts |
| Actilane 421 (bifunctional monomer) | 13.0 parts |
| FIRSTCURE ST-1 (polymerization inhibitor) | 0.05 parts |
| Lucirin TPO (radical polymerization initiator) | 8.9 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 2.

Comparative Example 2

The components below were stirred using a high-speed water-cooled stirrer to give a magenta UV inkjet ink. The viscosity was 24 mPa·s.
Magenta Ink Composition

| | |
|---|---|
| Magenta mill base B (coloring material, polymerizable monomer, polymeric dispersant) | 14.0 parts |
| N-Vinylcaprolactam (cyclic monofunctional monomer) | 20.0 parts |
| Fancryl FA-512A (cyclic monofunctional monomer) | 32.0 parts |
| Actilane 421 (bifunctional monomer) | 20.0 parts |
| FIRSTCURE ST-1 (polymerization inhibitor) | 0.05 parts |
| Lucirin TPO (radical polymerization initiator) | 8.9 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 2.

Comparative Example 3

The components below were stirred using a high-speed water-cooled stirrer to give a cyan UV inkjet ink. The viscosity was 18 mPa·s.

Cyan Ink Composition

| | |
|---|---|
| Cyan mill base A (coloring material, polymerizable monomer, polymeric dispersant) | 6.0 parts |
| N-Vinylcaprolactam (cyclic monofunctional monomer) | 25.0 parts |
| SR489D (acyclic monofunctional monomer) | 32.0 parts |
| Fancryl FA-512A (cyclic monofunctional monomer) | 23.4 parts |
| FIRSTCURE ST-1 (polymerization inhibitor) | 0.05 parts |
| Lucirin TPO (radical polymerization initiator) | 8.5 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 3.

Comparative Example 4

The components below were stirred using a high-speed water-cooled stirrer to give a cyan UV inkjet ink. The viscosity was 14 mPa·s.

Cyan Ink Composition

| | |
|---|---|
| Cyan mill base A (coloring material, polymerizable monomer, polymeric dispersant) | 6.0 parts |
| N-Vinylcaprolactam (cyclic monofunctional monomer) | 25.0 parts |
| SR489D (acyclic monofunctional monomer) | 55.4 parts |
| FIRSTCURE ST-1 (polymerization inhibitor) | 0.05 parts |
| Lucirin TPO (radical polymerization initiator) | 8.5 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were carried out using the image thus obtained. The results are given in Table 3.

Comparative Example 5

The components below were stirred using a high-speed water-cooled stirrer to give a cyan UV inkjet ink. The viscosity was 12 mPa·s.

Cyan Ink Composition

| | |
|---|---|
| Cyan mill base A (coloring material, polymerizable monomer, polymeric dispersant) | 6.0 parts |
| SR489D (acyclic monofunctional monomer) | 80.4 parts |
| FIRSTCURE ST-1 (polymerization inhibitor) | 0.05 parts |
| Lucirin TPO (radical polymerization initiator) | 8.5 parts |
| Benzophenone (radical polymerization initiator) | 3.0 parts |
| IRGACURE 184 (radical polymerization initiator) | 2.0 parts |
| BYK-307 (surfactant) | 0.05 parts |

Inkjet recording was carried out using the ink composition thus obtained. The embossing test and the vacuum forming test were attempted using the image thus obtained, but since the ink coating was sticky, it could not be handled.

TABLE 1

| | | | Monofunctional radically polymerizable monomer | | | | |
|---|---|---|---|---|---|---|---|
| | Viscosity [mPa·s] | Color | Type of monomer | Amount added [wt %] | Total [wt %] | Embossing test | Vacuum forming test |
| Ex. 1 | 18 | Cyan | N-Vinylcaprolactam | 25.0 | 80.4 | Good | Good |
| | | | Phenoxyethyl acrylate (AMP-10G) | 20.0 | | | |
| | | | Dicyclopentenyloxyethyl acrylate (FA-512 A) | 35.4 | | | |
| Ex. 2 | 18 | Magenta | N-Vinylcaprolactam | 25.0 | 74.4 | Good | Good |
| | | | Phenoxyethyl acrylate (AMP-10G) | 20.0 | | | |
| | | | Dicyclopentenyloxyethyl acrylate (FA-512 A) | 29.4 | | | |
| Ex. 3 | 18 | Yellow | N-Vinylcaprolactam | 25.0 | 74.4 | Good | Good |
| | | | Phenoxyethyl acrylate (AMP-10G) | 20.0 | | | |
| | | | Dicyclopentenyloxyethyl acrylate (FA-512 A) | 29.4 | | | |
| Ex. 4 | 22 | Black | N-Vinylcaprolactam | 30.0 | 80.4 | Good | Good |
| | | | Dicyclopentenyloxyethyl acrylate (FA-512 A) | 50.4 | | | |
| Ex. 5 | 24 | White | N-Vinylcaprolactam | 18.0 | 68.4 | Good | Good |
| | | | Phenoxyethyl acrylate (AMP-10G) | 24.0 | | | |
| | | | Dicyclopentenyloxyethyl acrylate (FA-512 A) | 26.4 | | | |
| Ex. 6 | 23 | Cyan | N-Vinylcaprolactam | 32.0 | 80.4 | Good | Good |
| | | | Dicyclopentenyloxyethyl acrylate (FA-512 A) | 30.4 | | | |
| | | | Dicyclopentanyl methacrylate (FA-513M) | 18.0 | | | |
| Ex. 7 | 24 | Cyan | N-Vinylcaprolactam | 34.0 | 80.4 | Good | Good |
| | | | Phenoxyethyl acrylate (AMP-10G) | 30.4 | | | |
| | | | N-Cyclohexyl acrylamide | 16.0 | | | |
| Ex. 8 | 19 | Cyan | N-Vinylcaprolactam | 30.0 | 80.4 | Good | Good |
| | | | Phenoxyethyl acrylate (AMP-10G) | 25.4 | | | |
| | | | 2-Naphthyl acrylate | 25.0 | | | |
| Ex. 9 | 16 | Cyan | N-Vinylcaprolactam | 30.0 | 80.4 | Good | Good |
| | | | Phenoxyethyl acrylate (AMP-10G) | 25.4 | | | |
| | | | Isobornyl acrylate (SR506) | 25.0 | | | |

TABLE 1-continued

| | | | Monofunctional radically polymerizable monomer | | | | |
|---|---|---|---|---|---|---|---|
| | Viscosity [mPa·s] | Color | Type of monomer | Amount added [wt %] | Total [wt %] | Embossing test | Vacuum forming test |
| Ex. 10 | 15 | Cyan | N-Vinylcaprolactam<br>Tetrahydrofurfuryl acrylate | 30.0<br>50.4 | 80.4 | Good | Good |
| Ex. 11 | 18 | Cyan | N-Vinylcaprolactam<br>Phenoxyethyl acrylate (AMP-10G)<br>Dicyclopentenyloxyethyl acrylate (FA-512 A) | 12.0<br>33.0<br>35.4 | 80.4 | Good | Good |
| Ex. 12 | 23 | Cyan | Phenoxyethyl acrylate (AMP-10G)<br>Dicyclopentenyloxyethyl acrylate (FA-512 A) | 15.0<br>65.4 | 80.4 | Good | Good |

TABLE 2

| | | | Monofunctional radically polymerizable monomer | | | Polyfunctional monomer Diacrylate | | |
|---|---|---|---|---|---|---|---|---|
| | Viscosity [mPa·s] | Color | Type of monomer | Amount added [wt %] | Total [wt %] | (Actilane 421) Amount added [wt %] | Embossing test | Vacuum forming test |
| Ex. 13 | 23 | Magenta | N-Vinylcaprolactam<br>Dicyclopentenyloxyethyl acrylate (FA-512 A) | 25.0<br>47.0 | 72.0 | 8.4 | Good | Good |
| Ex. 14 | 23 | Magenta | N-Vinylcaprolactam<br>Dicyclopentenyloxyethyl acrylate (FA-512 A) | 25.0<br>44.0 | 69.0 | 11.4 | Good | Good |
| Ex. 15 | 23 | Magenta | N-Vinylcaprolactam<br>Dicyclopentenyloxyethyl acrylate (FA-512 A) | 25.0<br>41.0 | 66.0 | 14.4 | Good | Good |
| Comp. Ex. 1 | 24 | Magenta | N-Vinylcaprolactam<br>Dicyclopentenyloxyethyl acrylate (FA-512 A) | 25.0<br>34.0 | 59.0 | 21.4 | Cracks occurred in part of cured film. | Cracks occurred in part of cured film. |
| Comp. Ex. 2 | 24 | Magenta | N-Vinylcaprolactam<br>Dicyclopentenyloxyethyl acrylate (FA-512 A) | 20.0<br>32.0 | 52.0 | 28.4 | Cracks occurred in part of cured film. | Cracks occurred in part of cured film. |

TABLE 3

| | | | Monofunctional radically polymerizable monomer | | | Acyclic monofunctional monomer Tridecyl acrylate | | |
|---|---|---|---|---|---|---|---|---|
| | Viscosity [mPa·s] | Color | Type of monomer | Amount added [wt %] | Total [wt %] | (SR489D) Amount added [wt %] | Embossing test | Vacuum forming test |
| Ex. 16 | 20 | Cyan | N-Vinylcaprolactam<br>Dicyclopentenyloxyethyl acrylate (FA-512 A) | 25.0<br>55.4 | 80.4 | 0 | Good | Good |
| Ex. 17 | 18 | Cyan | N-Vinylcaprolactam<br>Dicyclopentenyloxyethyl acrylate (FA-512A) | 25.0<br>40.4 | 65.4 | 15.0 | Good | Good |
| Comp. Ex. 3 | 18 | Cyan | N-Vinylcaprolactam<br>Dicyclopentenyloxyethyl acrylate (FA-512A) | 25.0<br>23.4 | 48.4 | 32.0 | Part of cured film transferred to mold. | Cracks occurred in part of cured film. |
| Comp. Ex. 4 | 14 | Cyan | N-Vinylcaprolactam | 25.0 | 25.0 | 55.4 | Part of cured film transferred to mold. | Cracks occurred in part of cured film. |
| Comp. Ex. 5 | 12 | Cyan | — | — | 0 | 80.4 | Cured film was extremely sticky, no molding test was carried out. | |

What is claimed is:

1. A process for producing a molded printed material comprising:

(A) a step of forming an image by discharging an ink composition on a thermoplastic resin support by an inkjet method, the ink composition comprising at least 60 wt % relative to the entire ink composition of at least one cyclic structure-containing monofunctional radically polymerizable monomer having only one group selected from the group consisting of an acrylate group, a methacrylate group, an acrylamide group, and a methacrylamide group;

(B) a step of curing the ink composition by irradiating with actinic radiation the image obtained so as to obtain a printed material having the image cured on a support; and
(C) a step a molding the printed material by stretching the printed material due to thermal deformation,
wherein the ink composition comprises at least one N-vinyl group-containing cyclic monomer, phenoxyethylacrylate, and a cyclic structure-containing compound represented by Formula (1) as the cyclic-structure-containing monofunctional radically polymerizable monomer having only one group selected from the group consisting of an acrylate group, a methacrylate group, an acrylamide group, and a methacrylamide group, containing group,

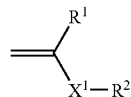

Formula (1)

wherein R¹ denotes a hydrogen atom or a methyl group, X¹ denotes a first divalent linking group in which (—C(O)O—) or (—C(O)NH—) is bonded to the ethylenically unsaturated double bond shown in Formula (1), the first divalent linking group is optionally bonded to at least one second divalent linking group selected from the group consisting of a single bond, an ether bond (—O—), an ester bond (—C(O)O— or —OC(O)—), an amide bond (—C(O)NH— or —NHC(O)—), a carbonyl bond (—C(O)—), and an optionally branched alkylene group having no greater than 20 carbons, R² is a group represented by Formula (IV), (V) or (VI),

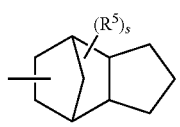

Formula (IV)

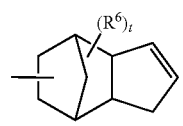

Formula (V)

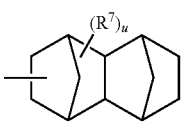

Formula (VI)

wherein R⁵, R⁶, and R⁷ independently denote a substituent, s, t, and u independently denote and integer of 0 to 5, and the R⁵s, the R⁶s, and the R⁷s are each identical to or different from each other,
wherein the ink composition comprises an acyclic monofunctional monomer, the total content of the acyclic monofunctional monomer being no greater than 20 wt % of the entire ink composition, and
wherein the molding is embossing, vacuum forming, pressure forming, or vacuum/pressure forming.

2. The process for producing the molded printed material according to claim 1, wherein the at least one N-vinyl group-containing cyclic monomer is at least one monomer selected from the group consisting of N-vinylcarbazole, 1-vinylimidazole, and an N-vinyllactam.

3. The process for producing the molded printed material according to claim 2, wherein the having at least one N-vinyl group-containing cyclic monomer is an N-vinyllactam.

4. The process for producing the molded printed material according to claim 3, wherein the N-vinyllactam is a compound represented by Formula (2),

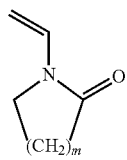

Formula (2)

in the formula, m denotes an integer of 1 to 5.

5. The process for producing the molded printed material according to claim 3, wherein the N-vinyllactam is N-vinylcaprolactam.

6. The process for producing the molded printed material according to claim 2, wherein the ink composition comprises 10 to 40 wt % relative to the entire ink composition of the at least one N-vinyl group-containing cyclic monomer.

7. The process for producing the molded printed material according to claim 1, wherein the ink composition comprises a radical polymerization initiator and a colorant.

8. The process for producing the molded printed material according to claim 1, wherein the ink composition further comprises a polyfunctional monomer, the content of the polyfunctional monomer being no greater than 18.4 wt % of the entire ink composition.

9. The process for producing the molded printed material according to claim 1, wherein the support is polyethylene terephthalate.

10. The process for producing the molded printed material according to claim 9, wherein the molding is embossing and the support is has a thickness in a range of 100 to 500 μm.

11. The process for producing the molded printed material according to claim 10, wherein the thickness is in a range of 100 to 250 μm.

12. A molded printed material obtained by the process for producing the molded printed material according to claim 1.

13. The process for producing the molded printed material according to claim 1, wherein the molding is embossing.

14. The process for producing the molded printed material according to claim 1, wherein the molding is embossing and the support is a thermoplastic resin support which has a thickness is a range of 100 to 500 μm.

15. The process for producing the molded printed material according to claim 1, wherein the ink composition comprises at least one compound selected from the group consisting of (M-1) to (M-24) as the cyclic structure-containing monofunctional radically polymerizable monomer having only one group selected from the group consisting of an acrylate group, a methacrylate group, an acrylamide group, and a methacrylamide group.

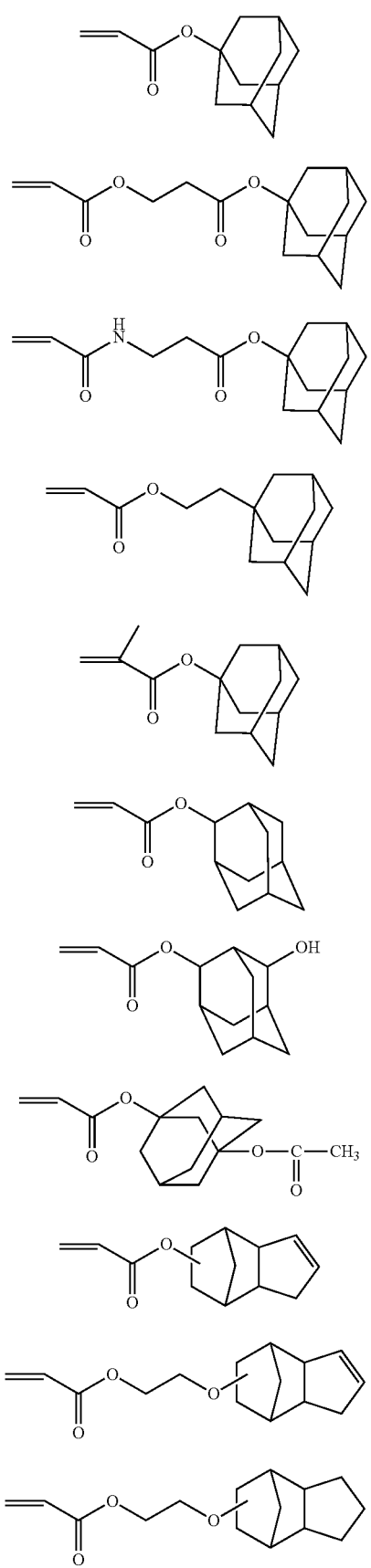

-continued
(M-23)
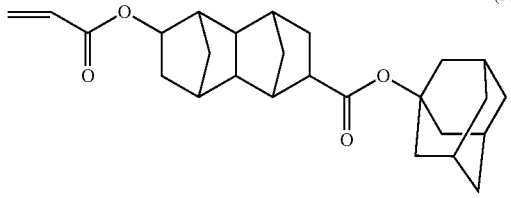
-continued
(M-24)
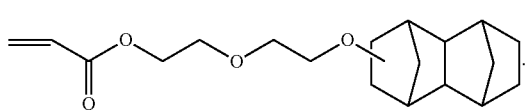
* * * * *